United States Patent
Nogawa et al.

(10) Patent No.: US 9,524,528 B2
(45) Date of Patent: Dec. 20, 2016

(54) MANAGEMENT APPARATUS AND MANAGEMENT METHOD

(71) Applicant: FUJITSU FSAS INC., Kawasaki-shi, Kanagawa (JP)

(72) Inventors: Hiroshi Nogawa, Kawasaki (JP); Hirofumi Izumi, Kawasaki (JP); Motoki Dai, Kawasaki (JP); Shinichi Kawahara, Kawasaki (JP); Shuichiro Suetsugu, Kawasaki (JP); Shinichi Egashira, Kawasaki (JP)

(73) Assignee: FUJITSU FSAS INC., Kawasaki (JP)

( * ) Notice: Subject to any disclaimer, the term of this patent is extended or adjusted under 35 U.S.C. 154(b) by 37 days.

(21) Appl. No.: 14/593,273

(22) Filed: Jan. 9, 2015

(65) Prior Publication Data

US 2015/0199809 A1 Jul. 16, 2015

(30) Foreign Application Priority Data

Jan. 16, 2014 (JP) ................. 2014-005961

(51) Int. Cl.
*G06K 9/00* (2006.01)
*G06Q 50/02* (2012.01)
*G06Q 30/00* (2012.01)

(52) U.S. Cl.
CPC ............ *G06Q 50/02* (2013.01); *G06Q 30/018* (2013.01)

(58) Field of Classification Search
None
See application file for complete search history.

(56) References Cited

U.S. PATENT DOCUMENTS

| | | | |
|---|---|---|---|
| 6,178,308 B1 * | 1/2001 | Bobrow | G09B 5/00 382/276 |
| 6,934,704 B2 * | 8/2005 | Okada | G06Q 10/06 700/102 |
| 7,698,167 B2 * | 4/2010 | Batham | G06F 17/3089 705/26.62 |
| 8,200,552 B2 * | 6/2012 | Swanson | G06Q 10/0875 705/26.1 |
| 8,245,150 B2 * | 8/2012 | Katter, Jr. | G06F 17/30398 345/632 |
| 8,756,117 B1 * | 6/2014 | Ballaro | G06Q 10/087 705/26.1 |
| 2002/0111844 A1 * | 8/2002 | Vanstory | G06Q 10/06 705/7.13 |

FOREIGN PATENT DOCUMENTS

JP 2011-86208 4/2011

* cited by examiner

*Primary Examiner* — Hadi Akhavannik
(74) *Attorney, Agent, or Firm* — Staas & Halsey LLP

(57) ABSTRACT

A management apparatus receives image data corresponding to item numbers of the JGAP criteria or foods from each training support apparatus. The management apparatus generates, for each item number, an image data group of image data having been rearranged based on their priorities. The management apparatus notifies the image data groups to each training support apparatus. The training support apparatus performs display control of respective image data associated with each item number, based on the image data groups notified from the management apparatus.

4 Claims, 24 Drawing Sheets

FIG.3

| LARGE ITEM | MEDIUM ITEM | SMALL ITEM |
|---|---|---|
| A. FARM OPERATION AND SALES MANAGEMENT | 1. FARM OPERATION | 1.1 BASIC PRINCIPLES |
| | | 1.2 MANAGEMENT OF RESOURCES |
| | | 1.3 MANAGEMENT OF SUBCONTRACTORS |
| | | 1.4 CORRECTING NON-COMPLIANCES OF THE RULES OF THE FARM AND SELF ASSESSMENT |
| | 2. PLANNING AND RECORDKEEPING | 2.1 PRODUCTION PLANNING |
| | | 2.2 RECORD MANAGEMENT |
| | 3. SALES MANAGEMENT AND TRACEABILITY | 3.1 SALES MANAGEMENT |
| | | 3.2 TRACEABILITY |
| | | 3.3 PRODUCE MANAGEMENT |
| | | 3.4 COMPLAINT MANAGEMENT AND RECALL OF PRODUCE |
| B. FOOD SAFETY | 4. MANAGEMENT OF SOIL, WATER, AND SEEDLINGS | 4.1 SOIL MANAGEMENT |
| | | 4.2 MANAGEMENT OF WATER USED DURING CULTIVATION |
| | | 4.3 MANAGEMENT OF WATER USED AFTER HARVESTING |
| | | 4.4 SELECTION AND MANAGEMENT OF PROPAGATION MATERIALS |
| | 5. FERTILIZERS (INCLUDING SOIL CONDITIONERS, SOIL REVITALIZERS, PLANT STRENGTHENERS, FOLIAR FERTILIZERS, COMPOSTS) MANAGEMENT | 5.1 SELECTION AND APPLICATION PLANNING OF FERTILIZERS (INCLUDING SOIL CONDITIONERS, SOIL REVITALIZERS, PLANT STRENGTHENERS, FOLIAR FERTILIZERS, AND COMPOSTS) |
| | | 5.2 PREPARATION AND APPLICATION OF FERTILIZERS (INCLUDING SOIL CONDITIONERS, SOIL REVITALIZERS, PLANT STRENGTHENERS, FOLIAR FERTILIZERS, AND COMPOSTS) |
| | | 5.3 RECORD OF FERTILIZER APPLICATIONS (INCLUDING SOIL CONDITIONERS, SOIL REVITALIZERS, PLANT STRENGTHENERS, FOLIAR FERTILIZERS, AND COMPOSTS) |
| | | 5.4 STORAGE OF FERTILIZERS (INCLUDING SOIL CONDITIONERS, SOIL REVITALIZERS, PLANT STRENGTHENERS, FOLIAR FERTILIZERS, AND COMPOSTS) |
| | 6. AGRICULTURAL CHEMICAL MANAGEMENT | 6.1 SELECTION AND APPLICATION PLANNING OF AGRICULTURAL CHEMICALS |
| | | 6.2 PREPARATION AND APPLICATION OF AGRICULTURAL CHEMICALS |
| | | 6.3 CLEANING AFTER APPLICATION AND RECORDKEEPING |
| | | 6.4 STORING OF AGRICULTURAL CHEMICALS |
| | | 6.5 DRIFT OF AGRICULTURAL CHEMICALS (FLY-IN AND SCATTER) |
| | | 6.6 MRL (MAXIMUM RESIDUE LIMIT) ANALYSIS |
| | 7. HYGIENE MANAGEMENT RELATED TO HARVESTING AND TRANSPORT (INCLUDING FINAL PACKING IN THE FIELD) | |
| | 8. PRODUCE HANDLING (STORAGE, SORTING, PREPARATION, WASHING, PACKING, AND DISPATCHMENT) | |
| C. ENVIRONMENTALLY SUSTAINABLE AGRICULTURE | 9. WATER CONSERVATION | 9.1 CONSERVATION OF WATER QUANTITY |
| | | 9.2 CONSERVATION OF WATER QUALITY |
| | 10. SOIL CONSERVATION | |
| | 11. CONSIDERATION FOR SURROUNDING LANDS | |
| | 12. WASTE MANAGEMENT, REDUCTION, AND RECYCLING | |
| | 13. ENERGY EFFICIENCY | |
| | 14. ENVIRONMENTAL AWARENESS AND CONSIDERATION FOR BIODIVERSITY | |
| D. WORK SAFETY | 15. WORKERS' SAFETY | 15.1 PREVENTION OF ACCIDENTS |
| | | 15.2 PROCEDURES IN CASE OF ACCIDENTS |
| | | 15.3 PARTICIPATION IN INSURANCE |
| E. CONTROL POINTS FOR SPROUTS ONLY | | |
| F. CONTROL POINTS FOR MUSHROOMS ONLY | | |
| G. CONTROL POINTS FOR JGAP+G | A. FARM OPERATION AND SALES MANAGEMENT | |
| | B. FOOD SAFETY | |
| | C. ENVIRONMENTALLY SUSTAINABLE AGRICULTURE | |
| | D. WORK SAFETY AND WORK WELFARE | |

FIG.4

| SMALL ITEM | ITEM NUMBER | LEVEL | CONTROL POINTS | COMPLIANCE CRITERIA | REMARKS | RESULTS | |
|---|---|---|---|---|---|---|---|
| 1.1 BASIC PRINCIPLES | 1.1.1 | MAJOR MUST | ACTIVELY IMPLEMENTS JGAP | CAN EXPLAIN THE REASONS FOR THE IMPLEMENTATION OF JGAP AND THE PURPOSES OF IMPLEMENTATION | CHECK ON-SITE IS UNNECESSARY AND THUS NOT INCLUDED IN TRAINING ON-SITE | OK | COMPLIANCE |
| | 1.1.2 | MINOR MUST | MAINTAINS FARM ORGANIZED AND CLEAN | (1) THE FIELDS AND INFRASTRUCTURES ARE REGULARLY CLEANED (2) THERE IS NO WASTE OR LITTER IN THE FIELDS AND INFRASTRUCTURES | CHECK AT OFFICE IS UNNECESSARY AND THUS NOT INCLUDED IN TRAINING AT OFFICE | (1) OK (2) OK | |
| 1.2 MANAGEMENT OF RESOURCES | 1.2.1 | MAJOR MUST | RESPONSIBILITIES AND AUTHORITIES ARE CLEARLY DEFINED | THERE IS A MANAGEMENT ORGANOGRAM THAT CLEARLY ILLUSTRATES THE FOLLOWING PERSONNEL: (1) FARM MANAGER (2) PERSON RESPONSIBLE FOR PRODUCE MANAGEMENT (SEE CONTROL POINT 3.3.1) (3) PERSON RESPONSIBLE FOR FERTILIZER APPLICATION (SEE CONTROL POINT 5.1.1) (4) PERSON RESPONSIBLE FOR AGRICULTURAL CHEMICAL APPLICATION (SEE CONTROL POINT 6.1.1) (5) PERSON RESPONSIBLE FOR STORAGE OF AGRICULTURAL CHEMICALS (SEE CONTROL POINT 6.4.1) (6) PERSON RESPONSIBLE FOR WORK SAFETY (SEE CONTROL POINT 15.1.1) | | (1) OK (2) OK (3) OK (4) OK (5) OK (6) OK | COMPLIANCE |
| | 1.2.3 | MINOR MUST | MACHINERY IS APPROPRIATELY MAINTAINED | (1) FERTILIZER APPLICATION EQUIPMENTS, AGRICULTURAL CHEMICAL APPLICATION EQUIPMENTS, AND OTHER MOTORIZED EQUIPMENTS AND MACHINERY ARE CHECKED AND MAINTAINED AT LEAST ONCE A YEAR, SO AS TO PREVENT LABOR ACCIDENTS, PRODUCE CONTAMINATION, OR SOIL CONTAMINATION CAUSED BY FAILURE OF EQUIPMENTS OR MACHINERY (2) THERE IS A RECORD OF REGULAR CHECKS AND MAINTENANCE OF EQUIPMENTS AND MACHINERY (3) IF EXTERNAL CHECK AND MAINTENANCE SERVICE IS USED, RECEIPTS AND RELEVANT DOCUMENTS ARE KEPT | | (1) OK (2) OK (3) NG | NON-COMPLIANCE |
| | 1.2.6 | RECOMMENDATION | INTELLECTUAL PROPERTIES ARE PROTECTED | (1) APPLICATION FOR A PATENT OR UTILITY MODEL FOR ANY NEW TECHNIQUE DEVELOPED HAS BEEN FILED (2) ANY NEW VARIETY GROWN HAS BEEN REGISTERED (3) APPLICATION FOR TRADEMARK REGISTRATION HAS BEEN FILED FOR ANY BRANDED PRODUCT | | (1) NG (2) NG (3) NG | NON-COMPLIANCE |
| ...... | | | | ...... | ...... | — — | N/A |

FIG.5

| ITEM NUMBER | SECTION INFORMATION |
|---|---|
| 1.1.1 | FARM OPERATION>PLANNING AND ORGANIZATION >JGAP RELATED |
| 1.1.2 | STORAGE WAREHOUSE>AGRICULTURAL CHEMICALS >CLEANLINESS AND TIDINESS<br>STORAGE WAREHOUSE>FERTILIZERS AND SEEDS >CLEANLINESS AND TIDINESS<br>STORAGE WAREHOUSE>AGRICULTURAL MACHINERY >CLEANLINESS AND TIDINESS<br>FIELD>SEEDLING GROWING GROUND >CLEANLINESS AND TIDINESS<br>FIELD>GROWING GROUND >CLEANLINESS AND TIDINESS<br>FRUIT SORTING AND PROCESSING PLACE >FRUIT SORTING PLACE>CLEANLINESS AND TIDINESS<br>FRUIT SORTING AND PROCESSING PLACE >PROCESSING PLACE>CLEANLINESS AND TIDINESS |
| | ... |
| 1.2.3 | PRODUCTION MANAGEMENT>MACHINERY AND EQUIPMENTS>MAINTENANCE AND INSPECTION<br>STORAGE WAREHOUSE>AGRICULTURAL MACHINERY AND EQUIPMENTS>SAFETY |
| | ... |

FIG.6

CONDITION TABLE (153)

| CONDITION | RELEVANT ITEM NUMBERS |
|---|---|
| RECOMMENDATION ITEMS ARE ALSO TO BE SUBJECTED TO TRAINING | N.N.N TO N.N.N |
| MUSHROOMS ARE CULTIVATED | N.N.N TO N.N.N |
| SPROUTS ARE CULTIVATED | N.N.N TO N.N.N |
| AGRICULTURAL CHEMICALS ARE USED | N.N.N TO N.N.N |
| EXPANSION OF FARM IS BEING CONSIDERED | N.N.N TO N.N.N |
| SHIPMENT OVERSEAS IS DONE | N.N.N TO N.N.N |
| CONSIGNMENT IS DONE | N.N.N TO N.N.N |
| GGAP EQUIVALENCE IS TO BE CERTIFIED | N.N.N TO N.N.N |
| GENETICALLY MODIFIED FARM PRODUCE IS HANDLED | N.N.N TO N.N.N |
| POSTHARVEST PROCESSING IS DONE | N.N.N TO N.N.N |
| ... | ... |

FIG.7

| LARGE ITEM | MEDIUM ITEM | SMALL ITEM |
|---|---|---|
| FARM OPERATION | PLANNING AND ORGANIZATION | JGAP RELATED |
| | | RESPONSIBILITY AND ROLES |
| | | PRODUCTION PLANNING |
| | | SEEDLINGS, AND VARIETIES |
| | ENVIRONMENTAL CONSERVATION | ENERGY EFFICIENCY |
| | | INDUSTRIAL WASTE |
| | | NATURE CONSERVATION |
| | WORK SAFETY | MEASURES TO PREVENT ACCIDENTS |
| | | HYGIENE |
| PRODUCTION MANAGEMENT | SOIL AND WATER QUALITY | MEASURES AGAINST CONTAMINATION |
| | | TEST |
| | AGRICULTURAL CHEMICALS | PLANNING |
| | | EXECUTION |
| | | RECORDKEEPING |
| | | STORAGE |
| | | RISK CONSIDERATION |
| | FERTILIZERS | PLANNING |
| | | EXECUTION |
| | | RECORDKEEPING |
| | | STORAGE |
| | | RISK CONSIDERATION |
| | MACHINERY AND EQUIPMENTS | MAINTENANCE AND INSPECTION |
| | | RECORDKEEPING |
| SALES MANAGEMENT | TRACEABILITY | SALES CONTRACT |
| | | PRODUCE LOT IDENTIFICATION |
| | | DEALING WITH COMPLAINTS |
| | PRODUCE SAFETY | APPROPRIATE PRODUCE MANAGEMENT FROM HARVEST TO TRANSPORT |
| | | APPROPRIATE PRODUCE MANAGEMENT FOR DISPATCHMENT |

FIG.8

| LARGE ITEM | MEDIUM ITEM | SMALL ITEM |
|---|---|---|
| STORAGE WAREHOUSE | AGRICULTURAL CHEMICALS | CLEANLINESS AND TIDINESS |
| | | STORAGE |
| | | DISSEMINATION AND NOTICE OF RULES |
| | | LABELS AND CONTAINERS |
| | | EQUIPMENTS AND ENVIRONMENT USED IN PREPARATION |
| | | WORK PLACE AND ENVIRONMENT |
| | | EQUIPMENTS AND ENVIRONMENT USED IN TIDYING UP |
| | | SAFETY |
| | | MEASURES AGAINST DRIFT |
| | | WASTE DISPOSAL |
| | FERTILIZERS AND SEEDS | CLEANLINESS AND TIDINESS |
| | | STORAGE |
| | | DISSEMINATION AND NOTICE OF RULES |
| | | LABELS AND CONTAINERS |
| | | EQUIPMENTS AND ENVIRONMENT USED IN PREPARATION |
| | | WORK PLACE AND ENVIRONMENT |
| | | EQUIPMENTS AND ENVIRONMENT USED IN TIDYING UP |
| | | SAFETY |
| | | MEASURES AGAINST DRIFT |
| | | WASTE DISPOSAL |
| | AGRICULTURAL MACHINERY AND EQUIPMENTS | CLEANLINESS AND TIDINESS |
| | | STORAGE |
| | | DISSEMINATION AND NOTICE OF RULES |
| | | LABELS AND CONTAINERS |
| | | EQUIPMENTS AND ENVIRONMENT USED IN PREPARATION |
| | | WORK PLACE AND ENVIRONMENT |
| | | EQUIPMENTS AND ENVIRONMENT USED IN TIDYING UP |
| | | SAFETY |
| | | MEASURES AGAINST DRIFT |
| | | WASTE DISPOSAL |

FIG.9

| LARGE ITEM | MEDIUM ITEM | SMALL ITEM |
|---|---|---|
| FIELD | SEEDLING GROWING GROUND | CLEANLINESS AND TIDINESS |
| | | STORAGE |
| | | DISSEMINATION AND NOTICE OF RULES |
| | | LABELS AND CONTAINERS |
| | | EQUIPMENTS AND ENVIRONMENT USED IN PREPARATION |
| | | WORK PLACE AND ENVIRONMENT |
| | | EQUIPMENTS AND ENVIRONMENT USED IN TIDYING UP |
| | | SAFETY |
| | | MEASURES AGAINST DRIFT |
| | | WASTE DISPOSAL |
| | GROWING GROUND | CLEANLINESS AND TIDINESS |
| | | STORAGE |
| | | DISSEMINATION AND NOTICE OF RULES |
| | | LABELS AND CONTAINERS |
| | | EQUIPMENTS AND ENVIRONMENT USED IN PREPARATION |
| | | WORK PLACE AND ENVIRONMENT |
| | | EQUIPMENTS AND ENVIRONMENT USED IN TIDYING UP |
| | | SAFETY |
| | | MEASURES AGAINST DRIFT |
| | | WASTE DISPOSAL |
| FRUIT SORTING AND PROCESSING PLACE | FRUIT SORTING PLACE | CLEANLINESS AND TIDINESS |
| | | STORAGE |
| | | DISSEMINATION AND NOTICE OF RULES |
| | | LABELS AND CONTAINERS |
| | | EQUIPMENTS AND ENVIRONMENT USED IN PREPARATION |
| | | WORK PLACE AND ENVIRONMENT |
| | | EQUIPMENTS AND ENVIRONMENT USED IN TIDYING UP |
| | | SAFETY |
| | | MEASURES AGAINST DRIFT |
| | | WASTE DISPOSAL |
| | PROCESSING PLACE | CLEANLINESS AND TIDINESS |
| | | STORAGE |
| | | DISSEMINATION AND NOTICE OF RULES |
| | | LABELS AND CONTAINERS |
| | | EQUIPMENTS AND ENVIRONMENT USED IN PREPARATION |
| | | WORK PLACE AND ENVIRONMENT |
| | | EQUIPMENTS AND ENVIRONMENT USED IN TIDYING UP |
| | | SAFETY |
| | | MEASURES AGAINST DRIFT |
| | | WASTE DISPOSAL |

FIG.10

IMAGE MANAGEMENT TABLE (155)

| ITEM NUMBER | IMAGE DATA | COMMENT DATA | PUBLIC OR NON-PUBLIC FLAG |
|---|---|---|---|
| 1.1.1 | IMAGE DATA A | | OK |
| | IMAGE DATA B | | NG |
| | ... | | |
| 1.1.2 | IMAGE DATA X | SEPARATION IS PROPERLY DONE<br>THERE IS NO LITTER | OK |
| | ... | | |

JGAP TRAINING SUPPORT TOOL

"JGAP FARM CONTROL POINTS AND COMPLIANCE CRITERIA, FRUITS AND VEGETABLES 2010" VERSION

PLEASE INPUT PASSWORD

[   ] [LOG-IN]

IF YOU WANT TO CHANGE PASSWORD

[CHANGE PASSWORD]

IF YOU HAVE FORGOTTEN PASSWORD

[RESET PASSWORD]

FIG.13

```
                                    4:20 AM                          32%
  ◁BACK              START PAGE                              ⚙
          1. CHECK FOLLOWING INFORMATION    2. ENTER TARGET ARTICLES FOR THIS
72a                                                      TIME                    72b
      ┌─────────────────────────────┐   ┌──────────────────────────────┐
      │ NAME OF FARM: FSAS FARM     │   │   CARROT, SPINACH, CABBAGE,  │
      │ TRAINING START DATE AND     │   │   BURDOCK, JAPANESE WHITE RADISH │
      │ TIME:2012/08/31 16:45       │   └──────────────────────────────┘
      └─────────────────────────────┘
1a           3. PERFORM HEARING FOR TRAINING TARGET ITEMS
      ┌──────────────────────────────────────────────────────────────┐  72c
1c    │ ☑RECOMMENDATION ITEMS ARE TO    ☐MUSHROOMS ARE CULTIVATED (XX)│
      │  BE SUBJECTED TO TRAINING (XX)                                │
      │ ☐SPROUTS ARE CULTIVATED (XX)                                  │──1b
1d    │──────────────────────────────────────────────────────────────│
      │ ☑AGRICULTURAL CHEMICALS ARE    ☑EXPANSION OF FARM IS BEING   │──1e
1f    │  USED (XX)                      CONSIDERED (XX)               │
      │ ☐SHIPMENT OVERSEAS IS DONE (XX) ☑CONSIGNMENT IS DONE (XX)    │──1g
1h    │──────────────────────────────────────────────────────────────│
      │ ☐GGAP EQUIVALENCE IS TO BE      ☐GENETICALLY MODIFIED FARM PRODUCE│
1j    │  CERTIFIED (XX)                  IS HANDLED (XX)              │
      │ ☐POSTHARVEST PROCESSING IS                                    │──1i
      │  DONE (XX)                                                    │
      │──────────────────────────────────────────────────────────────│
      │         NUMBER OF TRAINING TARGETS: XX (OUT OF XXX)           │
      └──────────────────────────────────────────────────────────────┘
                              ┌──────┐
                              │ NEXT │
                              └──────┘
                                  │
                                 72d
```

| | | | | | | | |
|---|---|---|---|---|---|---|---|
| \multicolumn{8}{|l|}{4:20 AM — TRAINING RESULT DISPLAY — COMPLETE — 32%} |
| \multicolumn{8}{|l|}{NAME OF FARM: FSAS FACTORY} |
| \multicolumn{8}{|l|}{TARGET ARTICLES: CARROT, ONION, CAPSICUM, CABBAGE, ... [DISPLAY ALL] — TRAINING TIME PERIOD: 170 HOURS AND 35 MINUTES} |
| LARGE CLASSIFI-CATION | LEVEL | COMPLI-ANCE RATE | NUMBER OF ITEMS | EXEMP-TION | NUMBER OF TARGET ITEMS | COMPLI-ANCE | NON-COMPLI-ANCE |
| FARM OPERA-TION | MAJOR MUST | 100% (100%) | 32 | 0 (0) | 32 (32) | 32 | 0 |
| | MINOR MUST | 87% (100%) | 38 | 0 (0) | 38 (38) | 33 | 5 |
| | RECOMMEN-DATION | 78% (100%) | 23 | 0 (0) | 23 (23) | 18 | 5 |
| PRODUC-TION MANAGE-MENT | MAJOR MUST | 100% (100%) | 57 | 0 (0) | 57 (57) | 57 | 0 |
| | MINOR MUST | 92% (100%) | 51 | 0 (0) | 51 (51) | 47 | 4 |
| | RECOMMEN-DATION | 20% (100%) | 15 | 0 (0) | 15 (15) | 3 | 12 |
| SALES MANAGE-MENT | MAJOR MUST | 100% (100%) | 20 | 0 (0) | 20 (20) | 20 | 0 |
| | MINOR MUST | 100% (100%) | 5 | 0 (0) | 5 (5) | 5 | 0 |
| | RECOMMEN-DATION | 25% (25%) | 4 | 0 (0) | 4 (4) | 1 | 3 |
| TOTALS BY LEVEL | MAJOR MUST | 100% (100%) | 32 | 0 (0) | 32 (32) | 32 | 0 |
| | MINOR MUST | 87% (100%) | 38 | 0 (0) | 38 (38) | 83 | 5 |
| | RECOMMEN-DATION | 78% (100%) | 23 | 0 (0) | 23 (12) | 18 | 5 |
| TOTALS BY LARGE CLASSIFI-CATION | FARM OPERATION | 100% (100%) | 20 | 0 (0) | 20 (20) | 20 | 0 |
| | PRODUCTION MANAGEMENT | 100% (100%) | 5 | 0 (0) | 5 (5) | 5 | 0 |
| | SALES MANAGEMENT | 25% (25%) | 4 | 0 (0) | 1 (1) | 1 | 3 |

TABLE — GRAPH — LIST OF RESULTS — LIST OF PHOTOGRAPHS

FIG.19

| ITEM NUMBER | LEVEL | RESULT | PHOTO-GRAPH | COMMENTS |
|---|---|---|---|---|
| 1.1.1 | MAJOR MUST | COMPLI-ANCE | - | ·EACH PERSONNEL WAS CLEARLY WRITTEN IN ORGANIZATIONAL CHART |
| 1.1.2 | MAJOR MUST | COMPLI-ANCE | - | - |
| 1.1.3 | MAJOR MUST | NON-COMPLI-ANCE | AVAILABLE | ·NO RECORD OF INSPECTION<br>·EMPTY BOTTLES OF AGRICULTURAL CHEMICAL HAVE NOT BEEN APPROPRIATELY HANDLED |
| 1.1.4 | MAJOR MUST | NON-COMPLI-ANCE | - | ·NO PROOF OF AGREEMENT<br>·NO IMPLEMENTATION RECORD<br>·NO IMPLEMENTATION RECORD<br>·NO IMPLEMENTATION RECORD |
| 1.2.1 | MAJOR MUST | COMPLI-ANCE | - | ·EACH PERSONNEL WAS CLEARLY WRITTEN IN ORGANIZATIONAL CHART<br>·EMPTY BOTTLES OF AGRICULTURAL CHEMICAL HAVE NOT BEEN APPROPRIATELY |

Screen shows: 4:20 AM, 32% battery. TRAINING RESULT DISPLAY. END.
NAME OF FARM: FSAS FACTORY
TARGET ARTICLES: CARROT, ONION, CAPSICUM, CABBAGE, ...
DISPLAY ALL
TRAINING TIME PERIOD: 170 HOURS AND 35 MINUTES
ALL / COMPLIANCE / NON-COMPLIANCE
*DETAILS ARE DISPLAYED IF CELL IS TAPPED

TABLE | GRAPH | LIST OF RESULTS | LIST OF PHOTOGRAPHS

FIG.23

| ITEM NUMBER | IMAGE IDENTIFI-CATION INFORMA-TION | IMAGE DATA | COMMENT DATA | IMAGE CAPTURING DATE AND TIME | PRIORITY |
|---|---|---|---|---|---|
| 1.1.1 | 1A | IMAGE DATA 1A | | 2013/09/26 13:14 | 1 |
| | 2A | IMAGE DATA 2A | | 2013/09/27 14:30 | 2 |
| | 3A | IMAGE DATA 3A | | 2013/09/26 13:28 | 3 |
| ... | | | | | |
| 1.1.2 | 1B | IMAGE DATA 1B | SEPARATION IS PROPERLY DONE | 2013/09/26 15:30 | 1 |
| | 2B | IMAGE DATA 2B | THERE IS NO LITTER | 2013/09/20 11:24 | 2 |
| ... | | | | | |

FIG.24

| TRAINER IDENTIFICATION INFORMATION | NAME | RANK |
|---|---|---|
| U101 | MR. A | A-RANK |
| U102 | MS. B | B-RANK |
| U103 | MR. C | B-RANK |
| U104 | MS. D | C-RANK |
| ... | | |

| IMAGE IDENTIFICATION INFORMATION | TRAINER IDENTIFICATION INFORMATION | EVALUATION VALUE |
|---|---|---|
| 1A | U101 | 10 |
| 2A | U102 | 15 |
| 3A | U103 | 30 |
| ... | | |

FIG.26

IMAGE DATA

| TRAINER IDENTIFICATION INFORMATION | NAME |
|---|---|
| U101 | MR. A |

| ITEM NUMBER | IMAGE IDENTIFICATION INFORMATION | IMAGE DATA | COMMENT DATA | IMAGE CAPTURING DATE AND TIME |
|---|---|---|---|---|
| 1.1.1 | 1A | IMAGE DATA 1A | | 2013/09/26 13:14 |
| 1.1.2 | 2B | IMAGE DATA 2B | | 2013/09/26 15:30 |
| ... | | | | |

FIG.27

| ITEM NUMBER | IMAGE IDENTIFICA-TION IN-FORMATION | IMAGE DATA | COMMENT DATA | IMAGE CAPTURING DATE AND TIME | NAME | DISPLAY ORDER |
|---|---|---|---|---|---|---|
| | \multicolumn{6}{l}{IMAGE DATA GROUPS} | | | | | |

| ITEM NUMBER | IMAGE IDENTIFICATION INFORMATION | IMAGE DATA | COMMENT DATA | IMAGE CAPTURING DATE AND TIME | NAME | DISPLAY ORDER |
|---|---|---|---|---|---|---|
| 1.1.1 | 1A | IMAGE DATA 1A | | 2013/09/26 13:14 | MR. A | 1 |
| | 2A | IMAGE DATA 2A | | 2013/09/27 14:30 | MS. B | 2 |
| | 3A | IMAGE DATA 3A | | 2013/09/26 13:28 | MR. C | 3 |
| | ... | | | | | |
| 1.1.2 | 1B | IMAGE DATA 1B | SEPARATION IS PROPERLY DONE | 2013/09/26 15:30 | MR. A | 1 |
| | 2B | IMAGE DATA 2B | THERE IS NO LITTER | 2013/09/20 11:24 | MS. D | 2 |
| | ... | | | | | |

FIG.28

MANAGEMENT APPARATUS AND MANAGEMENT METHOD

CROSS-REFERENCE TO RELATED APPLICATION(S)

This application is based upon and claims the benefit of priority of the prior Japanese Patent Application No. 2014-005961, filed on Jan. 16, 2014, the entire contents of which are incorporated herein by reference.

FIELD

The embodiments discussed herein is are directed to a management apparatus and the like.

BACKGROUND

In recent years, the Japan Good Agricultural Practice (JGAP) has attracted attention. The JGAP is certification given to a farm working on food safety and environmental conservation. The JGAP certification is given to a farm that has passed an inspection based on the JGAP through the inspection by a third party organization. A farm that has received this JGAP certification is able to prove to consumers and farm produce buyers that the farm is a farm which they are able to purchase from and deal with, with confidence.

In order to receive certification of the JGAP, a farm needs to satisfy the "JGAP Farm Control and Compliance Criteria". In the description below, the "JGAP Farm Control and Compliance Criteria" will simply be referred to as the JGAP criteria. Contents of the JGAP criteria are complicated and multiple check items are present therein, and thus it is difficult for a manager of a farm to understand the contents of the JGAP criteria and improve the farm on his/her own. Thus, by receiving training from a JGAP trainer, the manager of the farm improves the farm to satisfy the JGAP criteria, before receiving an inspection by a third party organization.

As a conventional technique, for example, a technique for recording a work history in a check list by using IC tags or voices has been disclosed (see Japanese Laid-open Patent Publication No. 2011-086208).

However, the above mentioned conventional technique has a problem that a trainer is unable to conduct efficient training on how relevant locations should be improved in order to satisfy the criteria.

For example, if a JGAP trainer finds a good case example and the like while inspecting whether or not the criteria of check items are satisfied at various places of a farm, the JGAP trainer may sometimes capture an image of the scene in order to utilize it for future training. However, photographs shot by each JGAP trainer are just used by that JGAP trainer himself or herself and have been unable to be put to use in training by other JGAP trainers.

The above problem occurs not only when a JGAP trainer conducts training but occurs similarly also when a trainer who conducts training related to foods conducts training for a place that deals with foods. For example, it occurs similarly too when training based on the Food Communication Project (FCP) common factory management, AIB, JIB, ISO 22000, HACCP, and the like is conducted.

SUMMARY

According to a first proposal, a management apparatus has a receiving unit, a generating unit, and a notifying unit. The receiving unit receives: a plurality of check items that are subjected to inspection of whether or not they satisfy predetermined criteria related to a place that deals with farm produce or foods, and that are arranged in a predetermined order; and image data related to the check items from a plurality of terminal apparatuses respectively. The generating unit generates an image data group that is a plurality of image data having been received from the plurality of terminal apparatuses and having been rearranged for each related check item. The notifying unit notifies each image data group generated for each check item to the plurality of terminal apparatuses.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a data configuration of JGAP criteria data;

FIG. 4 is a diagram illustrating an example of check items included in small items of FIG. 3;

FIG. 5 is a diagram illustrating an example of a data configuration of a section information table;

FIG. 6 is a diagram illustrating an example of a data configuration of a condition table;

FIG. 7 is a first diagram illustrating an example of a data configuration of classification data;

FIG. 8 is a second diagram illustrating an example of the data configuration of the classification data;

FIG. 9 is a third diagram illustrating an example of the data configuration of the classification data;

FIG. 10 is a diagram illustrating an example of a data configuration of an image management table;

FIG. 11 is a diagram illustrating an example of a log-in screen;

FIG. 13 is a diagram illustrating an example of a training condition reception screen;

FIG. 15 is a second diagram illustrating an example of the item selection screen;

FIG. 17 is a first diagram illustrating an example of a training result;

FIG. 19 is a third diagram illustrating an example of the training result;

FIG. 23 is a diagram illustrating an example of a data configuration of an image management table according to the second embodiment;

FIG. 24 is a diagram illustrating an example of a data configuration of a trainer management table;

FIG. 25 is a diagram illustrating an example of a data configuration of an evaluation value table;

FIG. 26 is a diagram illustrating an example of a data configuration of image data received from a training support apparatus;

FIG. 27 is a diagram illustrating an example of a data configuration of image data groups;

FIG. 28 is a diagram illustrating a screen example of the training support apparatus according to the second embodiment.

DESCRIPTION OF EMBODIMENTS

Preferred embodiments of the present invention will be explained with reference to accompanying drawings. The invention is not limited by these embodiments.

[a] First Embodiment

Figure 1:
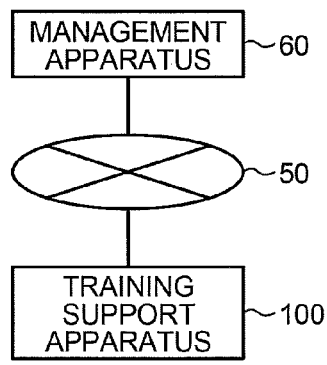
FIG. 1 is a diagram illustrating a configuration of a system according to a first embodiment.

An example of a configuration of a system according to a first embodiment will be described. FIG. 1 is a diagram illustrating a configuration of the system according to the first embodiment. As illustrated in FIG. 1, this system has a management apparatus 60 and a training support apparatus 100. For example, the management apparatus 60 and the training support apparatus 100 are connected to each other via a network 50. Herein, one training support apparatus 100 is illustrated, but other training support apparatuses may be connected to the network 50.

The training support apparatus 100 is, for example, a terminal apparatus used when a trainer conducts training for a manager or the like of a farm in order to satisfy the JGAP criteria. As described later, the training support apparatus 100 enables the trainer to efficiently perform inspection with respect to each check item of the JGAP criteria by performing display with the respective check items of the JGAP criteria being classified into a plurality of groups for respective predetermined sections.

The management apparatus 60 is an apparatus that collects and manages information on results of an inspection of the JGAP criteria or the like stored in the training support apparatus 100. Further, a trainer may transfer a past inspection result or the like stored in the management apparatus 60 to the training support apparatus 100 by performing data synchronization between the management apparatus 60 and the training support apparatus 100 before conducting training.

Figure 2:
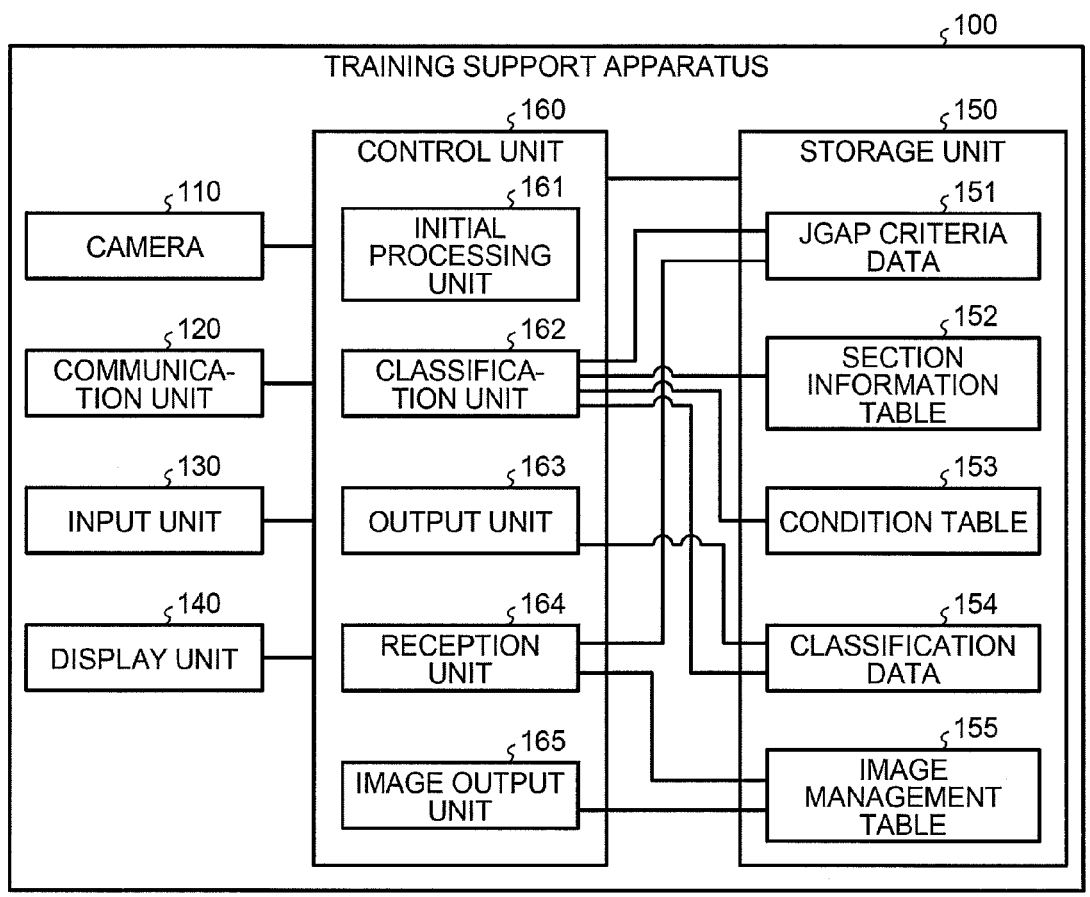
FIG. 2 is a functional block diagram illustrating a configuration of a training support apparatus according to the first embodiment.

An example of a configuration of the training support apparatus 100 illustrated in FIG. 1 will be described. FIG. 2 is a functional block diagram illustrating a configuration of the training support apparatus according to the first embodiment. As illustrated in FIG. 2, this training support apparatus 100 has a camera 110, a communication unit 120, an input unit 130, a display unit 140, a storage unit 150, and a control unit 160.

The camera 110 is a device that captures an image. The camera 110 outputs image data of the captured image to the control unit 160.

The communication unit 120 is a processing unit that executes data communication with the management apparatus 60 and other apparatuses via the network 50. The communication unit 120 corresponds to a communication device. The control unit 160 exchanges data with the management apparatus 60 and other apparatuses via the communication unit 120.

The input unit 130 is an input device for an instructor or the like to input various data to the training support apparatus 100. The input unit 130 corresponds to, for example, a key board, input keys, a touch panel, or the like. Further, an instructor or the like operates the input unit 130 to control the camera 110 and capture an image.

The display unit 140 is a display device that displays data output by the control unit 160 and image data captured by the camera 110. The display unit 140 corresponds to, for example, a display or a touch panel.

The storage unit 150 stores therein JGAP criteria data 151, a section information table 152, a condition table 153, classification data 154, and an image management table 155. The storage unit 150 corresponds to a storage device, such as a semiconductor memory element, like, for example, a random access memory (RAM), a read only memory (ROM), or a flash memory.

The JGAP criteria data 151 are data having a plurality of check items, which are subjected to inspection of whether or not they satisfy predetermined criteria related to farm produce, and which are arranged in a predetermined order. FIG. 3 is a diagram illustrating an example of a data configuration of the JGAP criteria data. FIG. 4 is a diagram illustrating an example of check items included in small items of FIG. 3.

As illustrated in FIG. 3, the JGAP criteria data 151 are classified into large items, medium items, and small items. For example, a large item, "A. Farm Operation and Sales Management", includes medium items, "1. Farm Operation", "2. Planning and Recordkeeping", and "3. Sales Management and Traceability". For example, the medium item, "1. Farm Operation", includes small items, "1.1 Basic Principles", "1.2 Management of Resources", "1.3 Management of Subcontractors", and "1.4 Correcting Non-Compliances of Rules of Farm and Self Assessment".

As illustrated in FIG. 4, each of the small items of FIG. 3 has corresponding check items corresponding thereto. The check items have attributes, which are item numbers, levels, control points, compliance criteria, remarks, and results. The item numbers are numbers for uniquely identifying the check items. The levels indicate importance of the check items. The levels available are "Major Must", "Minor Must", and "Recommendation" and a magnitude relation of importance among them is "Recommendation<Minor Must<Major Must". For the control point and compliance criteria, criteria required by the JGAP criteria are prescribed. The remarks indicate supplementary explanation. The results indicate results of inspection for respective items of the compliance criteria. If a criterion is satisfied, the result becomes "OK", and if the criterion is not satisfied, the result becomes "NG".

For example, for a check item having an item number, "1.2.3", results of its compliance criteria (1) and (2) are "OK", and a result of its compliance criterion (3) is "NG". Items of the results are initially blank and as a result of inspection by a trainer, "OK" or "NG" is stored therein.

The JGAP criteria data 151 illustrated in FIG. 3 and FIG. 4 are classified into the large items, medium items, and small items, but are not classified in view of efficiency of training for trainers. Accordingly, if a trainer performs inspection in order from the check item of the item number, "1.1.1", every time the check item is changed, a place to perform training is shifted and thus the trainer is unable to perform the inspection efficiently.

The section information table 152 has section information including information on places in a farm where the check items are inspected by a trainer and on persons of the farm to be inspected, and the section information is associated with each check item illustrated in FIG. 4 by the item numbers. FIG. 5 is a diagram illustrating an example of a data configuration of the section information table. As illustrated in FIG. 5, this section information table 152 has attributes, which are item numbers and section information. For example, section information, "Farm Operation>Planning and Organization>JGAP Related" of the item number, "1.1.1", of FIG. 5 is associated with the check item of the item number, "1.1.1", of FIG. 4.

In FIG. 5, the check item corresponding to the section information including "Farm Operation" is a check item for a case where training is performed for a person responsible for farm operation. The check item corresponding to the section information including "Production Management" is a check item for a case where training is performed for a person responsible for production management. Although omitted in FIG. 5, the check item corresponding to the section information including "Sales Management" is a check item for a case where training is performed for a person responsible for sales management.

The check item corresponding to section information including "Storage Warehouse" is a check item on which training is performed in a storage warehouse by a trainer. The check item corresponding to the section information including "Field" is a check item on which training is performed in a field by a trainer. The check item corresponding to the section information including "Fruit Sorting and Processing Place" is a check item on which training is performed in a fruit sorting and processing place by a trainer.

The section information has a multilayer structure of a large item, a medium item, and a small item. For example, the section information of the item number, "1.1.1", is "Farm Operation>Planning and Organization>JGAP Related". Therefore, the check item corresponding to the item number, "1.1.1", is sectioned into the small item, "JGAP Related", included in the medium item, "Planning and Organization", included in the large item, "Farm Operation".

The condition table 153 is a table that associates conditions for a case where a trainer conducts training of the JGAP criteria, with item numbers of check items corresponding respectively to these conditions. FIG. 6 is a diagram illustrating an example of a data configuration of the condition table. As illustrated in FIG. 6, the condition table 153 has a table 153a.

The table 153a has attributes, which are conditions and relevant item numbers. The conditions correspond to conditions set upon prehearing, for example. The relevant item numbers are information for identifying item numbers of check items corresponding to the conditions. In the relevant item numbers, "N.N.N", numerals corresponding to the item numbers of the check items are set.

The classification data 154 are data generated by a later described classification unit 162. The classification data 154 are data, which are check items classified, based on the section information corresponding to the check items, into a plurality of groups by section. FIG. 7, FIG. 8, and FIG. 9 are diagrams illustrating examples of a data configuration of the classification data.

The classification data 154 illustrated in FIG. 7 will be described. The large item, "Farm Operation", includes medium items, "Planning and Organization", "Environmental Conservation", and "Work Safety". For example, the medium item, "Planning and Organization", includes small items, "JGAP Related", "Responsibility and Roles", "Production planning", and "Seeds, Seedlings, and Varieties". Further, with each small item, the check item illustrated in FIG. 4 is associated. Although not illustrated in the figure, the check item of the item number, "1.1.1", is associated with the small item, "JGAP Related", of FIG. 7, for example. Further, with the other small items, the check items of the predetermined item numbers are associated. The check items sectioned into the large item, "Farm Operation", are formed of check items on which training is performed for a person responsible for farm operation.

The large item, "Production Management", includes medium items, "Soil and Water Quality", "Agricultural chemicals", "Fertilizers", and "Machinery and Equipments". For example, the medium item, "Machinery and Equipments", includes small items, "Maintenance and Inspection" and "Recordkeeping". Further, with each small item, the check item illustrated in FIG. 4 is associated. Although illustration thereof in the figure is omitted, with the small item, "Maintenance and Inspection", of FIG. 7, the check item of the item number, "1.2.3", is associated. Further, with the other small items, the check items of the predetermined item numbers are associated. The check items sectioned into the large item, "Production Management", are formed of check items on which training is performed for a person responsible for production management.

The large item, "Sales Management", includes medium items, "Traceability" and "Produce Safety". For example, the medium item, "Traceability", includes small items, "Sales Contract", "Produce Lot Number", and "Dealing with Complaints". Although illustration thereof in the figure is omitted, with each small item, the check item of the predetermined item number is associated. The check items sectioned into the large item, "Sales Management", are formed of check items on which training is performed for a person responsible for sales management.

The classification data 154 illustrated in FIG. 8 will be described. The large item, "Storage Warehouse", includes medium items, "Agricultural chemicals", "Fertilizers and Seeds", and "Agricultural Machinery and Equipments". For example, the medium item, "Agricultural chemicals", includes small items, "Cleanliness and Tidiness", "Storage", "Dissemination and Notice of Rules", "Labels and Containers", "Equipments and Environment Used in Preparation", "Work Place and Environment", "Equipments and Environment Used in Tidying up", "Safety", "Measures Against Drift", and "Waste Disposal". Although illustration thereof in the figure is omitted, with the small item, "Cleanliness and Tidiness", of FIG. 8, the check item of the item number, "1.1.2", is associated. Further, with the small item, "Safety", the check item of the item number, "1.2.3", is associated. Further, with the other small items, the check items of the predetermined item numbers are associated. The check items sectioned into the large item, "Storage Warehouse", are formed of check items on which training is conducted in a storage warehouse of a farm.

The classification data 154 illustrated in FIG. 9 will be described. The large item, "Field", includes medium items, "Seedling Growing Ground" and "Growing Ground". For example, the medium item, "Seedling Growing Ground", includes the small items, "Cleanliness and Tidiness", "Storage", "Dissemination and Notice of Rules", "Labels and Containers", "Equipments and Environment Used in Preparation", "Work Place and Environment", "Equipments and Environment Used in Tidying up", "Safety", "Measures Against Drift", and "Waste Disposal". Although illustration thereof in the figure is omitted, with the small item, "Cleanliness and Tidiness", of FIG. 9, the check item of the item number, "1.1.2", is associated. Further, with the small item, "Safety", the check item of the item number, "1.2.3", is associated. Further, with the other small items, the check items of the predetermined item numbers are associated. The check items sectioned into the large item, "Field", are formed of check items on which training is conducted in a field of a farm.

The large item, "Fruit Sorting and Processing Place", includes medium items, "Fruit Sorting Place" and "Processing Place". For example, the medium item, "Fruit Sorting Place", includes the small items, "Cleanliness and Tidiness", "Storage", "Dissemination and Notice of Rules", "Labels and Containers", "Equipments and Environment Used in Preparation", "Work Place and Environment", "Equipments and Environment Used in Tidying up", "Safety", "Measures Against Drift", and "Waste Disposal". Although illustration thereof in the figure is omitted, with the small item, "Cleanliness and Tidiness", of FIG. 9, the check item of the item number, "1.1.2", is associated. Further, with the small item, "Safety", the check item of the item number, "1.2.3", is associated. Further, with the other small items, the check items of the predetermined item numbers are associated. The check items sectioned into the large item, "Fruit Sorting and Processing Place", are formed of check items on which training is conducted in a fruit sorting and processing place of a farm.

The image management table 155 is a table for managing image data. For example, if a good case example is found when a trainer is conducting training for a farm, the good case example is shot by a camera. Image data shot then are stored in the image management table 155. FIG. 10 is a diagram illustrating an example of a data configuration of the image management table.

As illustrated in FIG. 10, the image management table 155 has attributes, which are item numbers, image data, comment data, and public or non-public flags. The item numbers are information for associating the image data, the comment data, and the public or non-public flags with the check items of FIG. 4. For example, the image data corresponding to the check item of the item number, "1.1.1", are "image data A" and "image data B". The comment data correspond to comments of a trainer on the image data or check item. The public or non-public flag is information indicating whether or not the corresponding image data are to be made public.

For example, as illustrated in FIG. 10, the public or non-public flag corresponding to "image data A" is "OK" and thus "image data A" are allowed to be made public. On the contrary, since the public or non-public flag corresponding to "image data B" is "NG", "image data B" are not allowed to be made public.

Description of FIG. 2 will be resumed. The control unit 160 has an initial processing unit 161, the classification unit 162, an output unit 163, a reception unit 164, and an image output unit 165. The control unit 160 corresponds to an integrated device, such as, for example, an application specific integrated circuit (ASIC) or a field programmable gate array (FPGA). Further, the control unit 160 corresponds to an electronic circuit, such as, for example, a CPU or a micro-processing unit (MPU).

The initial processing unit 161 is a processing unit that causes the display unit 140 to display a log-in screen and authenticates a trainer. FIG. 11 is a diagram illustrating an example of the log-in screen. For example, a trainer logs in by operating the input unit 130 to input a password in an input area 70a of a log-in screen 70.

If the training support apparatus 100 is initially activated, the initial processing unit 161 may set a password and a secret question by causing the display unit to display a screen for inputting a password and a secret question.

If the initial processing unit 161 determines that the password is correct, the initial processing unit 161 performs synchronization of data with the management apparatus 60 illustrated in FIG. 1. For example, information in the storage unit 150 is updated by information obtained from the management apparatus 60. If the initial processing unit 161 determines that the password is not correct, the initial processing unit 161 requests for a password again, for example.

The classification unit 162 is a processing unit that refers to the JGAP criteria data 151 and the section information table 152, and that generates, based on the section information associated with the respective check items, classification data, which are the respective check items having been classified into a plurality of groups by section.

For example, the classification unit 162 sequentially executes, after logging in, a process of displaying a list of farms, a process of receiving training conditions, and a classification process.

Figure 12:
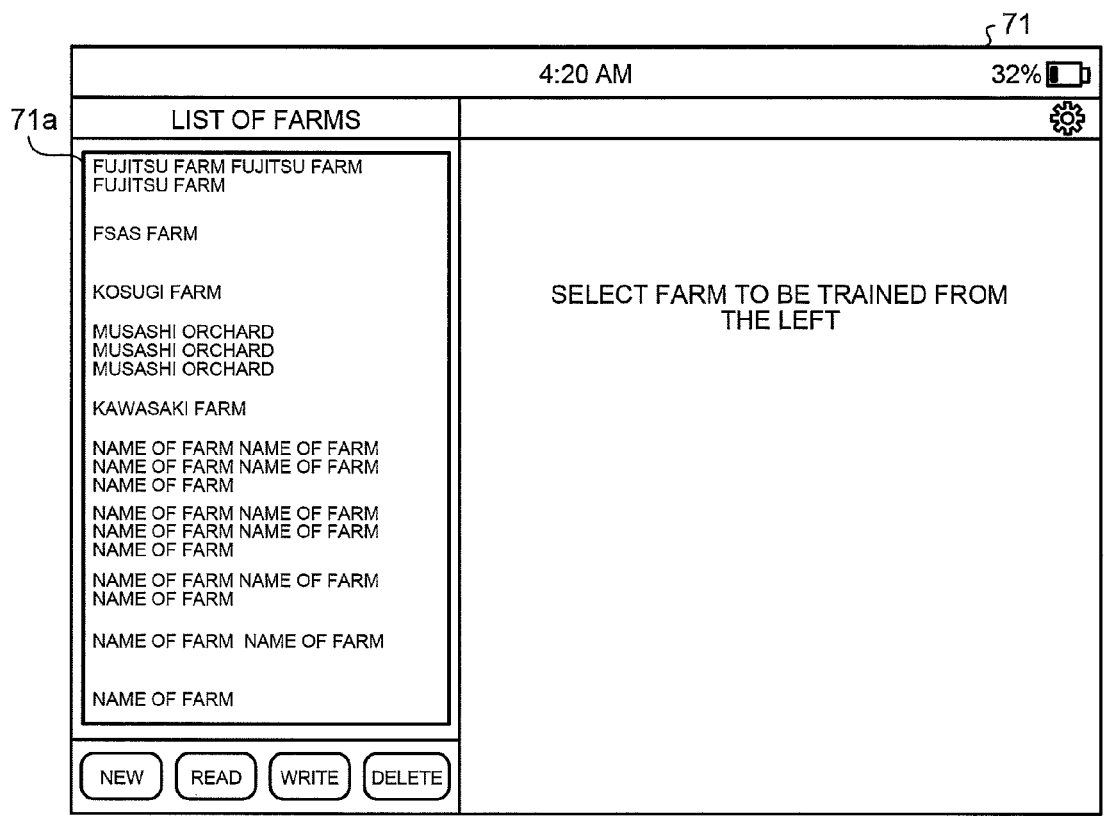
FIG. 12 is a diagram illustrating an example of a farm selection screen.

A process by the classification unit 162 displaying the list of farms will be described. The classification unit 162 causes the display unit 140 to display a farm selection screen. FIG. 12 is a diagram illustrating an example of the farm selection screen. As illustrated in FIG. 12, this farm selection screen 71 includes a farm selection area 71a. For example, the farm selection area 71a has names of a plurality of farms, which are selection candidates, listed therein. A trainer selects any of the farms in the farm selection area 71a by operating the input unit 130. After a farm is selected, the process of receiving training conditions is performed.

The process by the classification unit 162 receiving training conditions will be described. The classification unit 162 causes the display unit 140 to display a training condition reception screen. FIG. 13 is a diagram illustrating an example of the training condition reception screen. As illustrated in FIG. 13, this training condition reception screen 72 has a farm input area 72a, a target product input area 72b, and a training target item input area 72c.

The farm input area 72a is an area in which a name of a farm to be subjected to training is input. The classification unit 162 sets the name of the farm selected on the farm selection screen 71 illustrated in FIG. 12 into the farm input area 72a.

The target product input area 72b is an area in which a type of farm produce for which training is to be performed is input. For example, by performing hearing with a farm manager in advance before the training, a trainer determines the farm produce for which the training is to be performed, and by operating the input unit 130, the trainer inputs the name of the farm produce in the target product input area 72b.

The training target item input area 72c is an area in which various conditions, under which the farm produces the farm produce, for example, are input. For example, if recommendation items are going to be the training targets, the trainer operates the input unit 130 to enter a check mark in an item 1a. If mushrooms are cultivated, the trainer operates the input unit 130 to enter a check mark in an item 1b. If sprouts are cultivated, the trainer operates the input unit 130 to enter a check mark in an item 1c.

If agricultural chemicals are used, the trainer operates the input unit 130 to enter a check mark in an item 1d. If expansion of the farm is being considered, the trainer operates the input unit 130 to enter a check mark in an item 1e. If shipment overseas is carried out, the trainer operates the input unit 130 to enter a check mark in an item 1f. If consignment is carried out, the trainer operates the input unit 130 to enter a check mark in an item 1g.

If GGAP equivalence is to be certified, the trainer operates the input unit 130 to enter a check mark in an item 1h. If genetically modified farm produce is handled, the trainer operates the input unit 130 to enter a check mark in an item 1i. If postharvest processing is performed, the trainer operates the input unit 130 to enter a check mark in an item 1j.

The trainer presses a button 72d after inputting information in the farm input area 72a, the target product input area 72b, and the training target item input area 72c. The classification unit 162 executes a classification process when the classification unit 162 accepts pressing of the button 72d.

The classification process executed by the classification unit 162 will be described. First, the classification unit 162 compares the target product input area 72b and the training target item input area 72c of the training condition reception screen 72 with the condition table 153 to identify relevant item numbers. The classification unit 162 selects, as classification targets, check items corresponding to the identified relevant item numbers.

For example, if, as illustrated in FIG. 13, the check marks are in 1a, 1d, 1e, and 1g of the training target item input area 72c, the relevant item numbers of the first line, fourth line, fifth line, and seventh line of the table 153a of FIG. 6 are selected. For example, the classification unit 162 selects, as the classification targets, the check items corresponding to the relevant item numbers of the first line, fourth line, fifth line, and seventh line of the table 153a of FIG. 6.

The classification unit 162 classifies the check items into sections, based on the section information of the check items selected as the classification targets. In the following description, the check items selected as the classification targets will be abbreviated as target check items, as appropriate.

For example, a case where the target check items include the check item of the item number, "1.1.1", will be described. Referring to FIG. 5, the section information of the item number, "1.1.1", is "Farm Operation>Planning and Organization>JGAP Related". Accordingly, the classification unit 162 classifies the check item of the item number, "1.1.1", into the small item, "JGAP Related", of the medium item, "Planning and Organization", included in the large item, "Farm Operation".

A case where the target check items include the check item of the item number, "1.2.3", will be described. Referring to FIG. 5, the section information of the item number, "1.2.3", is "Production Management>Machinery and Equipments>Maintenance and Inspection" and "Storage Warehouse>Agricultural Machinery and Equipments>Safety". Accordingly, the classification unit 162 classifies the check item of the item number, "1.2.3", into the small item, "Maintenance and Inspection", of the medium item, "Machinery and Equipments", included in the large item, "Production Management". Further, the classification unit 162 classifies the check item of the item number, "1.2.3", into the small item, "Safety", of the medium item, "Agricultural Machinery and Equipments", included in the large item, "Storage Warehouse". As described above, the classification unit 162 may classify the check items into the respective sections, if a plurality of pieces of section information are included in the check item.

The classification unit 162 generates the classification data 154 illustrated in FIG. 7 to FIG. 9 by executing the above described classification process for each target check item.

Figure 14:
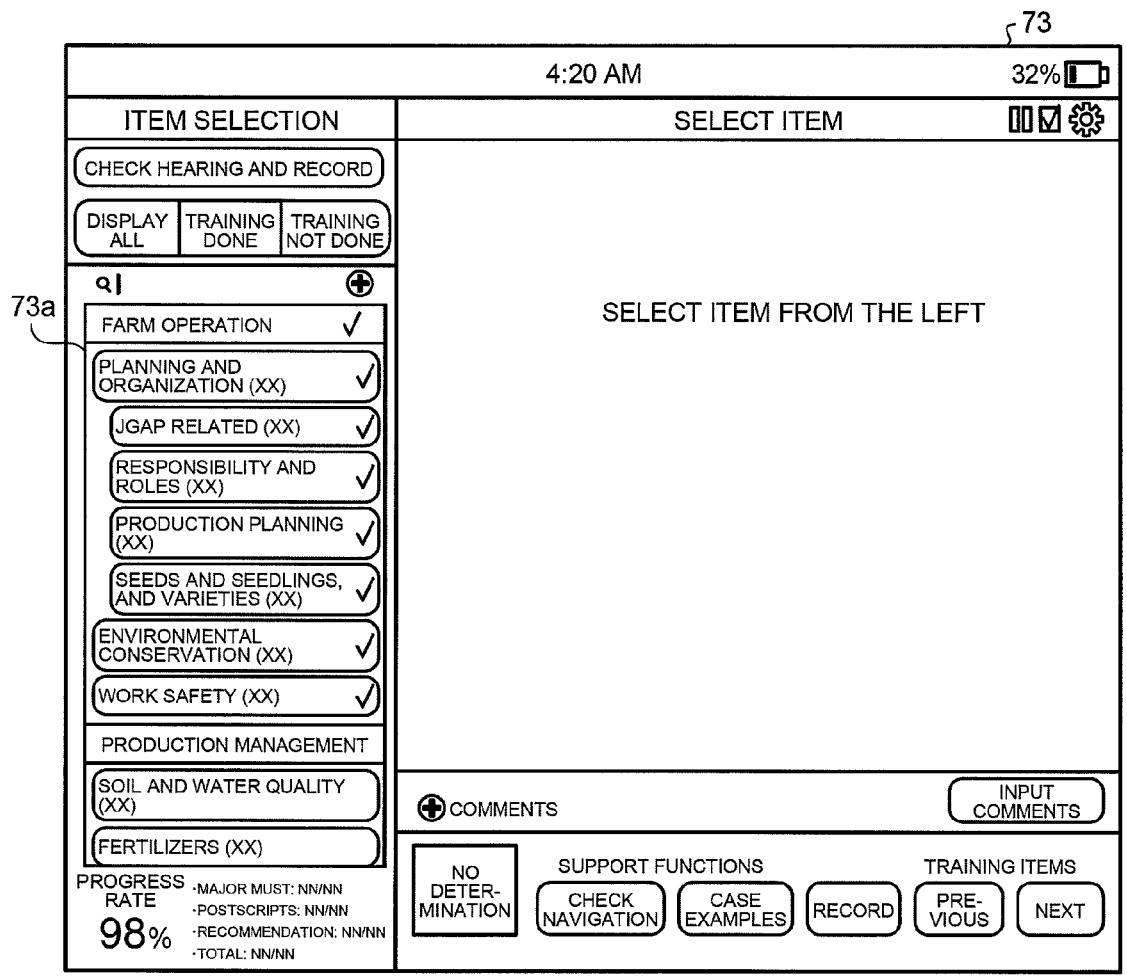
FIG. 14 is a first diagram illustrating an example of an item selection screen.
Figure 15:
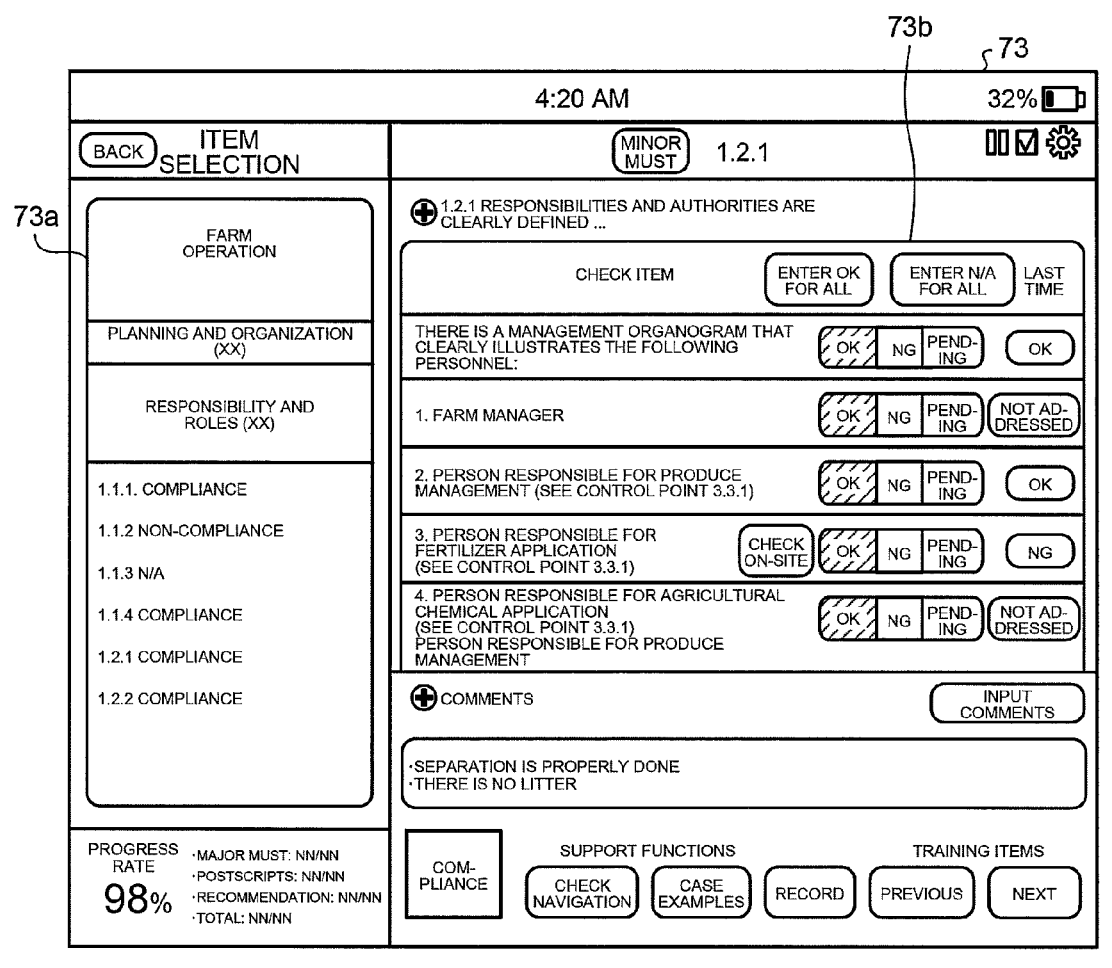

The output unit 163 is a processing unit that outputs the classification data 154 generated by the classification unit 162. For example, the output unit 163 causes the display unit 140 to display an item selection screen. FIG. 14 and FIG. 15 are diagrams illustrating examples of the item selection screen. For example, an item selection screen 73 includes an item selection area 73a. The item selection area 73a includes the respective large items. As illustrated in FIG. 14, when a trainer operates the input unit 130 to select a large item, the output unit 163 displays the medium items included in the selected large item. When the trainer operates the input unit 130 to select a medium item, the output unit 163 displays the small items included in the selected medium item. When the trainer operates the input unit 130 to select a small item, the output unit 163 displays check items included in the selected small item in the item selection area 73a of FIG. 15.

If, from the item selection area 73a of FIG. 15, the trainer operates the input unit 130 to select a check item, the output unit 163 displays contents of the check item in a display area 73b of the item selection screen 73.

For example, if the large item, "Farm Operation", of the item selection area 73a is selected, the output unit 163 displays the medium items, "Planning and Organization", "Environmental Conservation", and "Work Safety" in the item selection area 73a. If the medium item, "Planning and Organization", of the item selection area 73a is selected, the output unit 163 causes the small items, "JGAP Related", "Responsibility and Roles", "Production Planning", and "Seeds, Seedlings, and Varieties" to be displayed in the item selection area 73a.

If the small item, "Responsibility and Roles", is selected, the output unit 163 causes each check item sectioned into "Responsibility and Roles" to be displayed in the item selection area 73a. If the check item, "Responsibilities and authorities are clearly defined", of the item number, "1.2.1", is selected, the output unit 163 causes compliance criteria of the check item to be displayed in the display area 73b.

The trainer holds a discussion with a person responsible for farm operation according to the contents displayed in the display area 73b, and operates the input unit 130 to input results of the check. For example, the trainer selects "OK" or "NG" for each item of the compliance criteria. If "OK" or "NG" cannot be selected at that very instant, "Pending" maybe selected. "Compliance" and "Non-compliance" of the compliance criteria are automatically determined according to the results of the check. For example, the reception unit 164 sets "Compliance" if all of them are "OK" and "Non-compliance" if any one of them is "NG".

The reception unit 164 executes a process of receiving the results of the check, a process of receiving a good case example, and a process of displaying a training result.

The process of receiving the results of the check by the reception unit 164 will be described. The reception unit 164 is a processing unit that receives the results of the check by the trainer and reflects the results of the check into the JGAP criteria data 151. For example, the reception unit 164 identifies the relevant check item of the JGAP criteria data using, as a key, the item number being displayed in the display area 73b, and reflects the results of the check into results of respective compliance criteria of the identified check item.

For example, as illustrated in the display area 73b of FIG. 15, it is assumed that each item of "There is a management organogram that clearly illustrates the following personnel", "1. Farm manager", "2. Person responsible for produce management", "3. Person responsible for fertilizer application", "4. Person responsible for agricultural chemical application", "5. Person responsible for agricultural chemical storage", and "6. Person responsible for work safety" is "OK". In this case, the reception unit 164 sets results (1) to (6) of the item number, "1.2.1", of FIG. 4 to "OK".

The process of receiving a good case example by the reception unit 164 will be described. For example, if, during training, a trainer finds a good case example that would be a model upon training, the trainer operates the camera 110 by using the input unit 130 to capture an image of the good case example. If the camera 110 captures an image, the reception unit 164 displays a recording screen.

Figure 16:
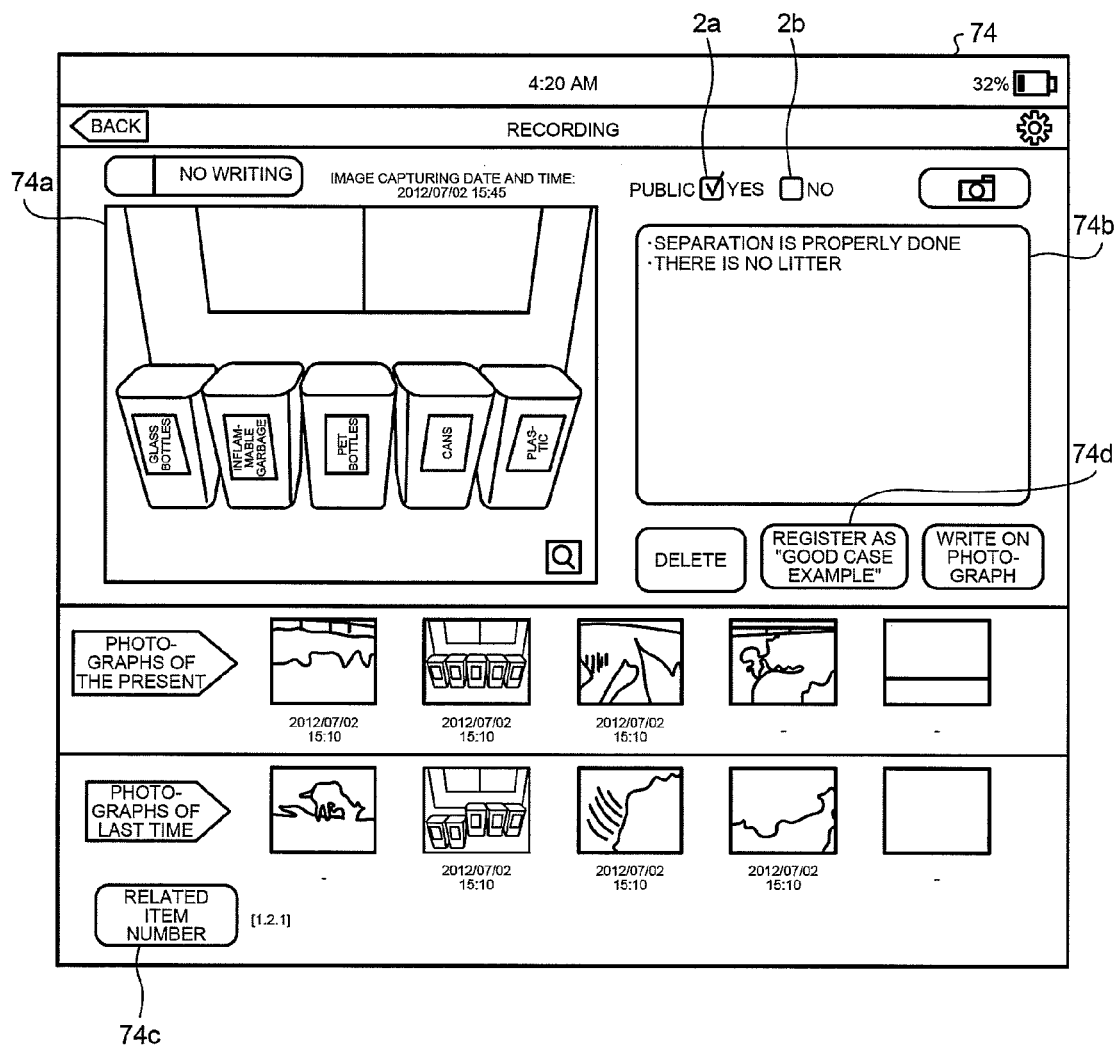
FIG. 16 is a diagram illustrating an example of a recording screen.

FIG. 16 is a diagram illustrating an example of the recording screen. As illustrated in FIG. 16, this recording screen 74 has an image display area 74a, a comment input area 74b, and a related item number 74c. The image display area 74a is an area in which data of the image captured by the camera 110 are displayed. The comment input area 74b is an area in which comments of the trainer are input. The related item number 74c is information associated with a check item. For example, if the related item number 74c is "1.2.1", the corresponding check item is the item number, "1.2.1". The information of the related item number 74c may be manually input by the trainer operating the input unit 130 or automatically input by the reception unit 164.

For example, as illustrated in FIG. 15, if an image is captured by the camera 110 while the check item of the item number, "1.2.1", is being displayed, the reception unit 164 causes the display unit 140 to display the recording screen 74 and automatically inputs the corresponding item number, "1.2.1", in the related item number 74c. The reception unit 164 may input the corresponding item number in the related item number 74c by using any other conventional technique.

If a button 74d is pressed by the trainer, the reception unit 164 registers the image data and the comments into the image management table 155 in association with the item number. If the image data are to be made public, the trainer enters a check mark in an item 2a of the recording screen 74. If the image data are not to be made public, the trainer enters a check mark in an item 2b of the recording screen 74. If a check mark is in the item 2a, the reception unit 164 sets the corresponding public or non-public flag to "OK" when the image data and comments are registered in the image management table 155. On the contrary, if a check mark is in the item 2b, the reception unit 164 sets the corresponding public or non-public flag to "NG" when the image data and comments are registered in the image management table 155.

A processing unit other than the reception unit 164 may execute the process of receiving a good case example. For example, a registration unit, which is not illustrated, instead of the reception unit 164, may execute the process of receiving a good case example.

Figure 18:
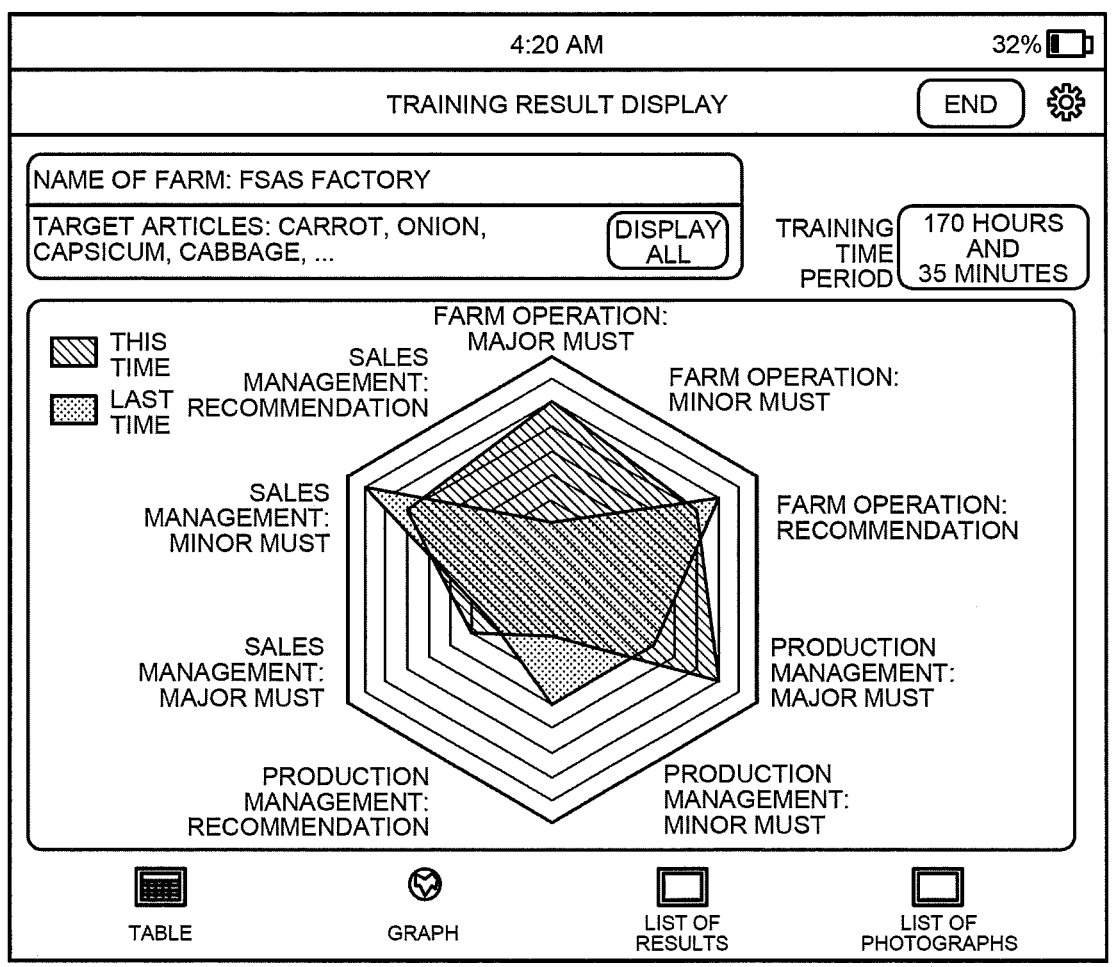
FIG. 18 is a second diagram illustrating an example of the training result.

The process by the reception unit 164 displaying a training result will be described. For example, the reception unit 164 sums up the numbers of "Compliance" and "Non-compliance" for the respective compliance criteria of the check items, based on the JGAP criteria data 151. The reception unit 164 outputs the number of "Compliance" and number of "Non-compliance" for each section as a training result. FIG. 17, FIG. 18, and FIG. 19 are diagrams illustrating examples of the training result. The reception unit 164 may display the training result section by section and level by level, based on the section information table 152.

The training result illustrated in FIG. 17 has attributes, which are, for example, large classifications, levels, compliance rates, the numbers of items, exemption, the numbers of target items, compliance, and non-compliance. The large classifications include, for example, "Farm Operation", "Production Management", and "Sales Management", corresponding to the large items of FIG. 7. Further, totals by level and totals by large classification are included. The levels correspond to the levels described with reference to FIG. 4. The number of items corresponds to the number of items of the compliance criteria. The compliance corresponds to the number of compliances. Non-compliance corresponds to the number of non-compliances. The compliance rate indicates in percentage a value obtained by dividing the value of compliance by the number of items. The reception unit 164 may display the farm name, the target articles, and the training time period together with the training result.

The training result illustrated in FIG. 18 represents the numbers of compliances by level of each section in a graph. Further, the reception unit 164 may display a training result from the last time and the present training result together. In the training result illustrated in FIG. 19, with each check item, a result, information of whether or not a photograph of a good case example is available, and comments are associated. The reception unit 164 may make the trainer to make a selection from the training results of FIG. 17 to FIG. 19 and output the selection or may cause them to be displayed in sequence.

The image output unit 165 is a processing unit that outputs image data stored in the image management table 155 to the display unit 140 and causes the display unit 140 to display the image data. The image output unit 165 causes image data, for which the public or non-public flag has been set to "OK", to be displayed. On the contrary, the image output unit 165 controls to not output image data, for which the public or non-public flag has been set to "NG", anywhere other than the farm at which the image data had been shot.

For example, the image output unit 165 may retrieve image data from the image management table 155 using the item number of the check item being output by the output unit 163 as a key and cause the display unit 140 to display the retrieved image data.

Figure 20:
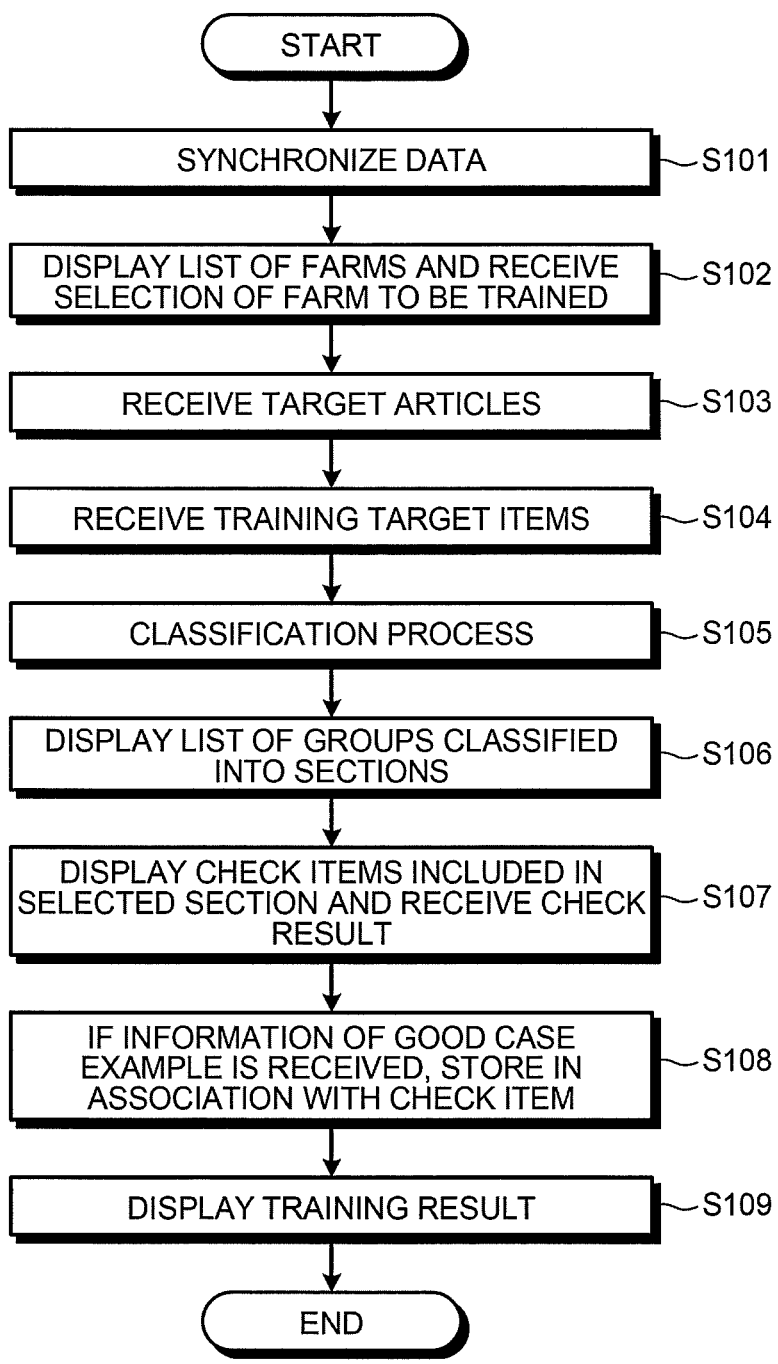
FIG. 20 is a flow chart illustrating a sequence of processing by the training support apparatus according to the first embodiment.

Next, a sequence of processing by the training support apparatus 100 according to this first embodiment will be described. FIG. 20 is a flow chart illustrating the sequence of the processing by the training support apparatus 100 according to the first embodiment. As illustrated in FIG. 20, the training support apparatus 100 synchronizes data with the management apparatus 60 (Step S101), displays a list of farms, and receives a selection of a farm to be trained (Step S102). At Step S102, the training support apparatus 100 displays the screen illustrated in FIG. 12 and causes a farm to be selected. If a selection of a farm to be trained is received and a past training result of that farm is available, the training support apparatus 100 may display the past training result.

The training support apparatus 100 receives target articles (Step S103), and receives training target items (Step S104). At Steps S103 and S104, the training support apparatus 100 displays the screen illustrated in FIG. 13 and receives the target articles and training target items.

The training support apparatus 100 executes a classification process (Step S105), and displays a list of groups classified into sections (Step S106). At Step S106, the training support apparatus 100 displays the screen illustrated in FIG. 14 and displays information, section by section.

The training support apparatus 100 displays check items included in a section selected by the trainer and receives results of the check (Step S107). At Step S107, the training support apparatus 100 displays the image illustrated in FIG. 15. The trainer conducts hearing, and sets the items to "OK" or "NG" according to results of the hearing.

If information of a good case example is received, the training support apparatus 100 stores image data and comments in association with the check item in the image management table 155 (Step S108). The training support apparatus 100 displays a training result (Step S109). At Step S109, the training support apparatus 100 displays the screens illustrated in FIG. 17 to FIG. 19. The training support apparatus 100 may display a list of image data for which the public or non-public flags stored in the image management table 155 are "OK", together with the training result.

Next, effects of the training support apparatus according to this first embodiment will be described. The training support apparatus 100 classifies, based on the JGAP criteria data 151 and the section information table 152, the plurality of check items into the plurality of groups by section. The training support apparatus 100 outputs the classified plurality of groups, receives results of the check for the output check items, and reflects the results of the check into the JGAP criteria data 151. The classified check items displayed by the training support apparatus 100 are classified according to the places and persons at and from which the hearing is conducted, and thus the trainer is able to inspect the check items altogether and is able to conduct the training efficiently.

Further, the training support apparatus 100 classifies, based on the section information of the section information table 152, the plurality of check items into the plurality of groups of multiple stages. Accordingly, since the check items are classified in multiple stages, the check items are able to be classified by grouping them into finer classifications and the trainer is able to conduct the training more efficiently.

Further, the training support apparatus 100 displays the training condition reception screen 72 to receive the various conditions, under which the farm produces the farm produce, for example, narrows down the check items on which the training is performed according to the received conditions, and classifies the narrowed down check items into the plurality of groups. Therefore, the trainer is able to conduct the training with any unnecessary check items being excluded.

Further, the training support apparatus 100 stores the image data of a good case example in the image management table 155 and outputs the image data as necessary. Therefore, the training by the trainer is able to be aided. Further, the training support apparatus 100 outputs the image data according to the public flag, and thus the image data not desired to be made public are preventable from being made public.

The training support apparatus 100 according to this embodiment classifies the check items of the JGAP criteria data 151 into sections and causes the display unit 140 to display the check items, but limitation is not made thereto.

For example, the training support apparatus 100 may display the check items in the order of the items of the JGAP criteria data without performing the classification.

Further, the trainer may operate the input unit 130 to input a keyword and retrieve the check items including the keyword. For example, if a keyword is received via the input unit 130, the training support apparatus 100 compares the keyword with the JGAP criteria data and causes the display unit 140 to display the check items including the keyword.

[b] Second Embodiment

Figure 21:
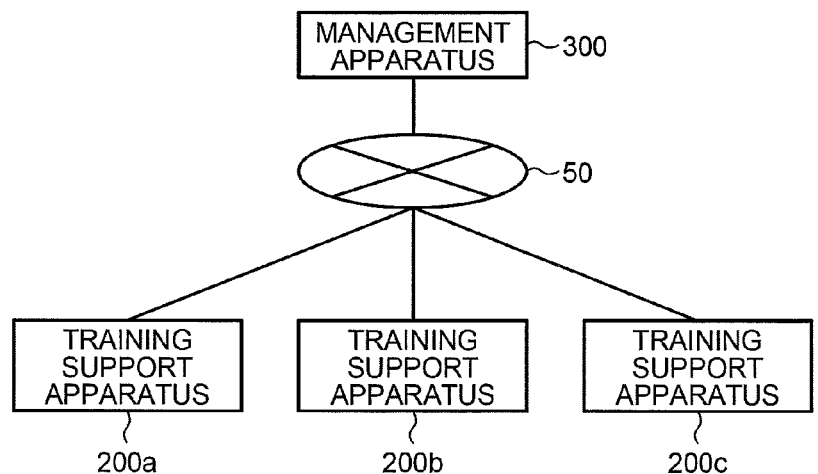
FIG. 21 is a diagram illustrating a configuration of a system according to a second embodiment.

An example of a configuration of a system according to a second embodiment will be described. FIG. 21 is a diagram illustrating a configuration of the system according to the second embodiment. As illustrated in FIG. 21, this system has training support apparatuses 200a, 200b, and 200c, and a management apparatus 300. For example, the management apparatus 300 and the training support apparatuses 200a, 200b, and 200c are connected to each other via the network 50. Although only the training support apparatuses 200a to 200c are illustrated herein, this system may include any other training support apparatus. In the following description, the training support apparatuses 200a, 200b, and 200c will be collectively denoted as a training support apparatus 200, as appropriate.

The training support apparatus 200 is, as described in the first embodiment, a terminal apparatus, which is used when a trainer conducts training for a manager of a farm, for example, in order to satisfy the JGAP criteria. The training support apparatus 200 displays each check item of the JGAP criteria, and the trainer inputs, similarly to the first embodiment, whether or not the check items are satisfied, into the training support apparatus 200.

Further, if the trainer finds a good case example while inspecting whether or not criteria of the check items are satisfied at various places of the farm, for example, the trainer captures an image thereof by operating the training support apparatus 200. If the image is captured, the training support apparatus 200 transmits image data associated with the check item to the management apparatus 300.

The management apparatus 300 is an apparatus that collects and manages, similarly to the first embodiment, information of an inspection result of the JGAP criteria or the like stored in the training support apparatus 200. Further, the management apparatus 300 collects the image data associated with the check items from each training support apparatus 200 and generates an image data group, which are image data having been rearranged from that of the highest rank, for each check item.

The management apparatus 300 notifies the image data group, which are the image data having been rearranged for each check item, to the training support apparatus 200 and causes the image data group to be displayed. As a result, by referring to the notified image data group, a trainer using the training support apparatus 200 is able to conduct training check item by check item while referring, not only to images captured by himself or herself, but also images captured by the other trainers.

Figure 22:
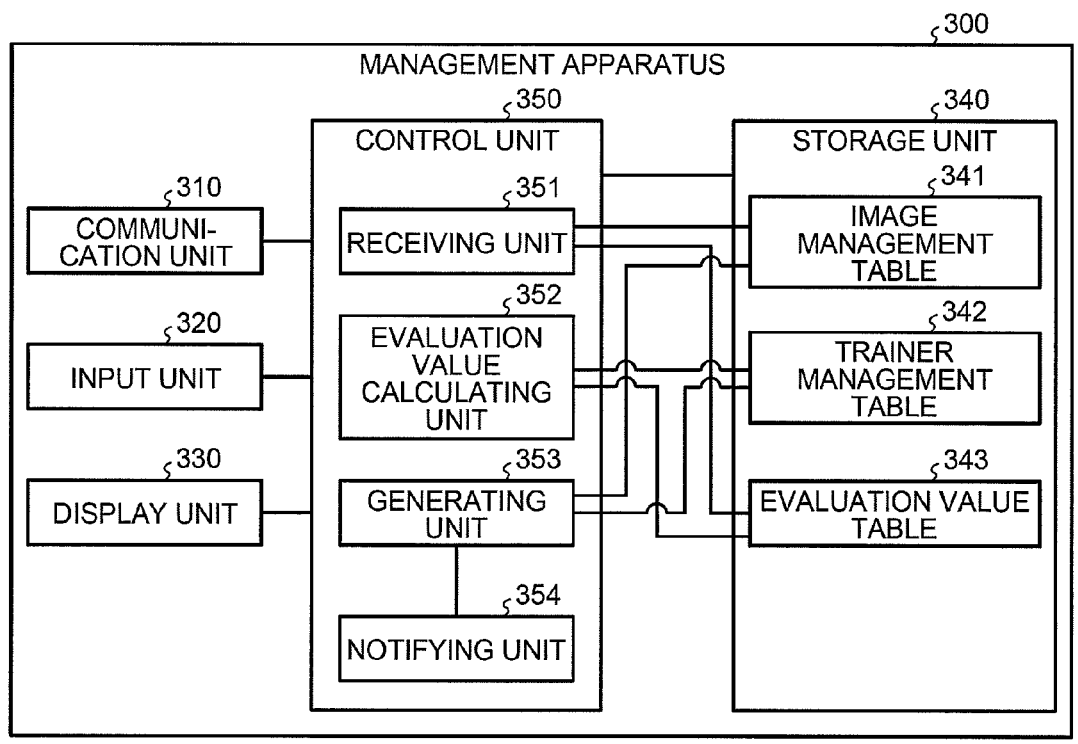
FIG. 22 is a functional block diagram illustrating a configuration of a management apparatus according to the second embodiment.

Next, an example of a configuration of the management apparatus 300 according to the second embodiment will be described. FIG. 22 is a functional block diagram illustrating a configuration of the management apparatus according to the second embodiment. As illustrated in FIG. 22, this management apparatus 300 has a communication unit 310, an input unit 320, a display unit 330, a storage unit 340, and a control unit 350. With reference to FIG. 22, only portions closely related to processing of this second embodiment will be described, and description of portions corresponding to the processing of the management apparatus 60 described in the first embodiment will be omitted.

The communication unit 310 is a processing unit that executes data communication with the training support apparatus 200 and other apparatuses, via the network 50. The communication unit 310 corresponds to a communication device. The later described control unit 350 exchanges data with the training support apparatus 200 and the other apparatuses via the communication unit 310.

The input unit 320 is an input device for an administrator or the like to input data to the management apparatus 300. The input unit 320 corresponds to, for example, a key board, input keys, a touch panel, or the like. The display unit 330 is a display device that displays data and the like output from the control unit 350. The display unit 330 corresponds to, for example, a display or a touch panel.

The storage unit 340 stores therein an image management table 341, a trainer management table 342, and an evaluation value table 343. The storage unit 340 corresponds to a storage device, such as, for example, a semiconductor memory element like a RAM, ROM, or flash memory, or a hard disk drive (HDD).

The image management table 341 is a table for managing image data obtained from the training support apparatus 200. FIG. 23 is a diagram illustrating an example of a data configuration of the image management table according to the second embodiment. As illustrated in FIG. 23, this image management table 341 holds therein item numbers, image identification information, image data, comment data, image capturing dates and times, and priorities, in association with one another.

Of these, the item numbers are information uniquely identifying the check items of the JGAP criteria data described with respect to the first embodiment. The image identification information is information uniquely identifying the image data. The image data are image data captured by the training support apparatus 200, for example. The comment data are comments of a trainer on the image data. The image capturing dates and times are dates and times at which the image data were captured.

The priorities are information indicating priorities of respective image data classified into each check item. The priorities are given by the later described control unit 350. For example, the priority, "1", is high, and the larger the value thereof becomes, the lower the priority becomes. An arrangement of "image data 1A, image data 2A, and image data 3A" is obtained, if the image data are arranged from those having the highest priority according to the priorities of the image data classified into the item number, "1.1.1", in FIG. 23.

The trainer management table 342 is a table holding therein information related to trainers. FIG. 24 is a diagram illustrating an example of a data configuration of the trainer management table. As illustrated in FIG. 24, this trainer management table 342 holds therein trainer identification information, names, and ranks, in association with one another. The trainer identification information is information uniquely identifying the trainers. The names are names of the trainers. The ranks are information indicating ranks of the trainers.

The evaluation value table 343 is a table for managing evaluation values of respective image data. FIG. 25 is a diagram illustrating an example of a data configuration of the evaluation value table. As illustrated in FIG. 25, this evaluation value table has image identification information, trainer identification information, and evaluation values. The image identification information is information for uniquely identifying the image data and the trainer identification information is information for uniquely identifying the trainers. According to a correspondence between the image identification information and the trainer identification information, a trainer who has captured the image data is identified. For example, an example illustrated in FIG. 25 illustrates that the image data having the image identification information, "1A", were captured by Mr. A having the trainer identification information, "U101".

The evaluation values indicate evaluation values of the image data identified by the image identification information. The evaluation values are calculated and given by the later described control unit 350. The larger the evaluation value is, the higher the priority described with respect to FIG. 23 becomes.

Description of FIG. 22 will be resumed. The control unit 350 has a receiving unit 351, an evaluation value calculating unit 352, a generating unit 353, and a notifying unit 354. The control unit 350 corresponds to an integrated device, such as, for example, an ASIC or FPGA. Further, the control unit 350 corresponds to an electronic circuit, such as, for example, a CPU or MPU.

The receiving unit 351 is a processing unit that receives image data from each training support apparatus 200. The receiving unit 351 registers the image data into the image management table 341.

An example of a data configuration of image data received by the receiving unit 351 will be described. FIG. 26 is a diagram illustrating an example of a data configuration of the image data received from the training support apparatus. As illustrated in FIG. 26, the image data have information associating the trainer identification information with the name. Further, the image data hold therein information associating the item numbers, the image identification information, the image data, the comment data, and the image capturing dates and times, with one another.

The trainer identification information is information for uniquely identifying the trainer and the name is the name of the trainer. The item numbers are information uniquely identifying the check items of the JGAP criteria data described in the first embodiment. The image identification information is information uniquely identifying the images. The image data are, for example, data of the images related to the item numbers, the images having been captured by the trainer corresponding to the trainer identification information. The comment data are the comments of the trainer on the image data. The image capturing dates and times are the dates and times at which the image data were captured.

According to the example illustrated in FIG. 26, Mr. A having the trainer identification information, "U101", has captured "image data 1A", as an image related to the item number, "1.1.1", of the JGAP criteria data. Further, Mr. A has captured "image data 2B", as an image related to the item number, "1.1.2".

If the receiving unit 351 receives image data, the receiving unit 351 registers, into the image management table 341, the item number included in the image data, the image identification information, the image data, the comment data, and the image capturing date and time, in association with one another. Further, if the receiving unit 351 receives image data, the receiving unit 351 registers, into the evaluation value table 343, the image identification information included in the image data and the trainer identification information in association with each other.

The evaluation value calculating unit 352 is a processing unit that calculates evaluation values for respective image data. For example, the evaluation value calculating unit 352 identifies an evaluation value of image data according to a rank of a trainer who has captured the image data. The evaluation value calculating unit 352 compares the trainer management table 342 with the evaluation value table, identifies a rank of the trainer corresponding to the trainer identification information, and gives an evaluation value according to the rank. For example, it is assumed that an evaluation value corresponding to an A-rank is "30", an evaluation value corresponding to a B-rank is "15", and an evaluation value corresponding to a C-rank is "10".

For example, the rank of the trainer identification information, "U101", corresponding to the image identification information, "1A", is "A-rank" (see FIG. 24). Accordingly, the evaluation value calculating unit 352 sets the evaluation value corresponding to the image identification information, "1A", to "30".

The evaluation value calculating unit 352 may adjust the evaluation value corresponding to the image identification information by other information, not being limited to the rank of the trainer. For example, if an evaluation of image data is received from the training support apparatus 200, a predetermined value may be added to the evaluation value according to the evaluation. For example, if evaluations, "good", "average", and "bad" are available, the evaluation value calculating unit 352 adds "3" to the evaluation value if the evaluation is "good", adds "0" to the evaluation value if "average", and adds "−1" to the evaluation value (subtracts "1" from the evaluation value) if "bad".

For example, if the evaluation, "good", of the image identification information, "1A", is received from the training support apparatus 200, the evaluation value calculating unit 352 accesses the trainer management table 342 and adds "3" to the evaluation value corresponding to the image identification information, "1A".

Further, if information indicating that the image data have been viewed is received from the training support apparatus 200, according to the number of times the image data have been viewed, a predetermined value may be added to the evaluation value. For example, if information indicating that the image identification information, "1A", has been viewed once is received from the training support apparatus 200, the evaluation value calculating unit 352 accesses the trainer management table 342 and adds a predetermined value to the evaluation value corresponding to the image identification information, "1A".

The evaluation value calculating unit 352 updates the evaluation values of the evaluation value table 343 by repeatedly executing the above processing.

The generating unit 353 is a processing unit that generates an image data group resulting from rearrangement of respective image data registered in the image management table 341 based on the evaluation values corresponding to the image data. Hereinafter, processing by the generating unit 353 will be described specifically.

The generating unit 353 compares the image management table 341 with the evaluation value table 343 to identify the evaluation values of the image data and identifies priorities of the image data for each item number. The generating unit 353 updates the priorities of the image management table 341 by assigning priorities in ascending order to the respective image data in descending order of the evaluation values. For example, for the respective image data of the item number, "1.1.1", it is assumed that the image data having the largest evaluation value is "image data 1A", the image data having the second largest is "image data 2A", and the image data having the third largest is "image data 3A". In that case, the generating unit 353 sets the priority of "image data 1A" to "1", the priority of "image data 2A" to "2", and the priority of "image data 3A" to "3".

After assigning the priorities to the image data for each item number by the above processing, the generating unit 353 generates the image data group, for each item number, resulting from the rearrangement of the image data according to the priorities. FIG. 27 is a diagram illustrating an example of a data configuration of image data groups. As illustrated in FIG. 27, the image data group associates the item numbers, the image identification information, the image data, the comment data, the image capturing dates and times, the names, and display orders with one another. Description of the item numbers, the image identification information, the comment data, the image capturing dates and times, the names, and the display orders illustrated in FIG. 27 is similar to the description presented above.

The generating unit 353 takes out, based on the image management table 341, information of the item numbers, the image identification information, the image data, the comment data, the image capturing dates and times, and the priorities, and registers the information in the image data groups illustrated in FIG. 27. Further, the generating unit 353 compares the image identification information with the trainer management table 342 to identify the names, and registers the identified names in the image data groups.

Further, the generating unit 353 rearranges the image data, based on the priorities in the image data group for each item number, by setting the image data having a higher priority as a record that is upper in the image data group. The generating unit 353 outputs information of the generated image data groups to the notifying unit 354.

The generating unit 353 may execute the above processing at predetermined time intervals or may execute the above processing in response to updating of the image data of the image management table.

If the notifying unit 354 obtains the information of the image data groups from the generating unit 353, the notifying unit 354 notifies the obtained information of the image data groups to each training support apparatus 200.

The training support apparatus 200 that has received the information of the image data groups from the notifying unit 354 performs control of display order in which the image data are displayed for each item number, according to the priorities associated with the respective image data.

Figure 28:
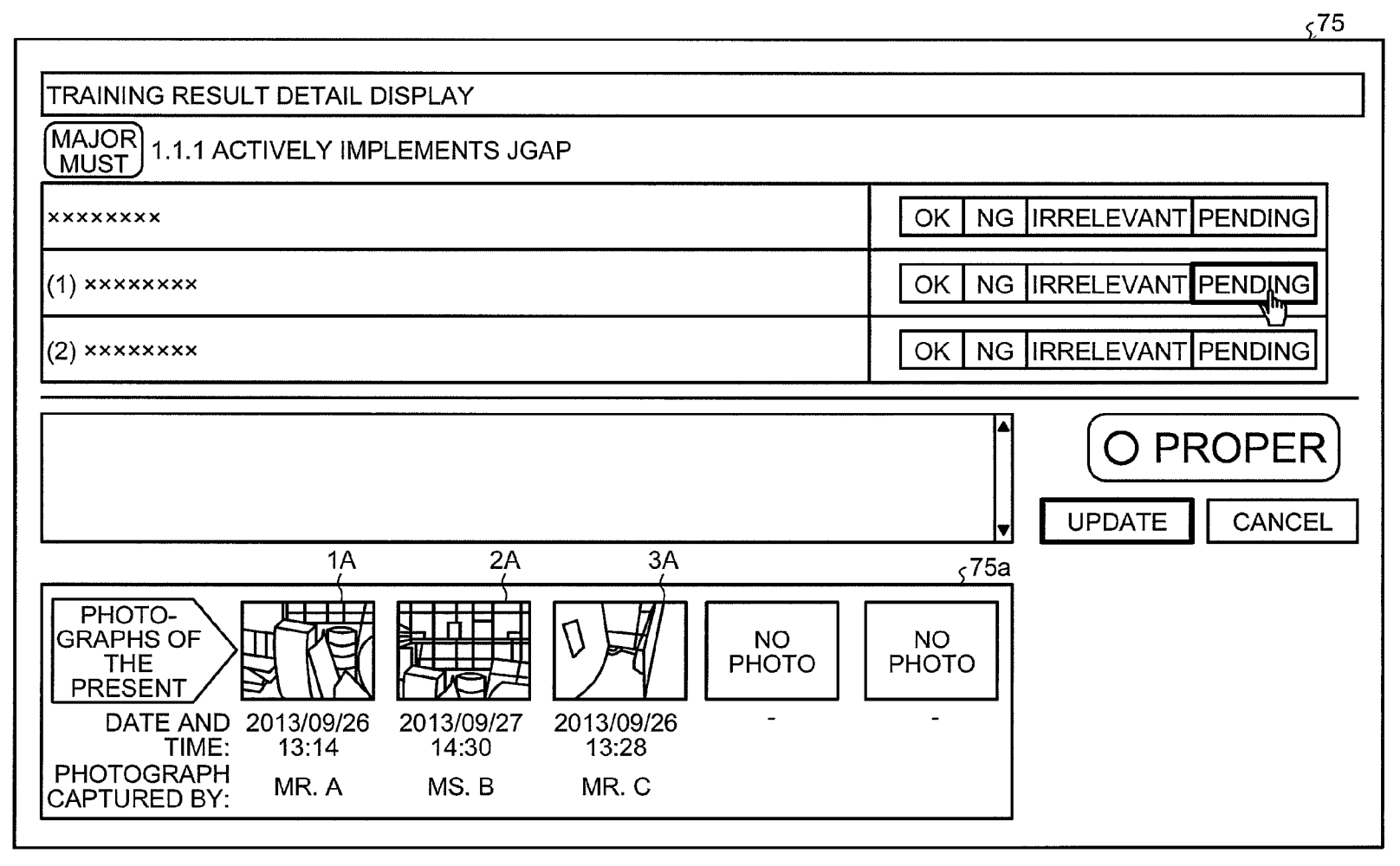

FIG. 28 is a diagram illustrating a screen example of the training support apparatus according to the second embodiment. As an example, FIG. 28 illustrates a screen example for a case where the training support apparatus 200 has obtained the information of the image data groups illustrated in FIG. 27 and the item number, "1.1.1", has been selected. For example, it is assumed that the descending order of the priorities of the image data corresponding to the item number, "1.1.1", is "image data 1A", "image data 2A", and "image data 3A". Accordingly, the training support apparatus 200 causes the image data to be displayed in the order of "image data 1A", "image data 2A", and "image data 3A", as illustrated in an area 75a of a screen 75.

Further, if image data are selected, the training support apparatus 200 notifies the image identification information of the selected image data and the number of times the image data have been selected, in association with each other, to the management apparatus 300. Further, if an evaluation corresponding to the image data is received, the training support apparatus 200 notifies information associating the image data and the evaluation, to the management apparatus 300. By receiving such feedback from the training support apparatus 200, the management apparatus 300 updates the evaluation values of the evaluation value table 343 and updates the priorities for the image data of the image management table 341.

Figure 29:
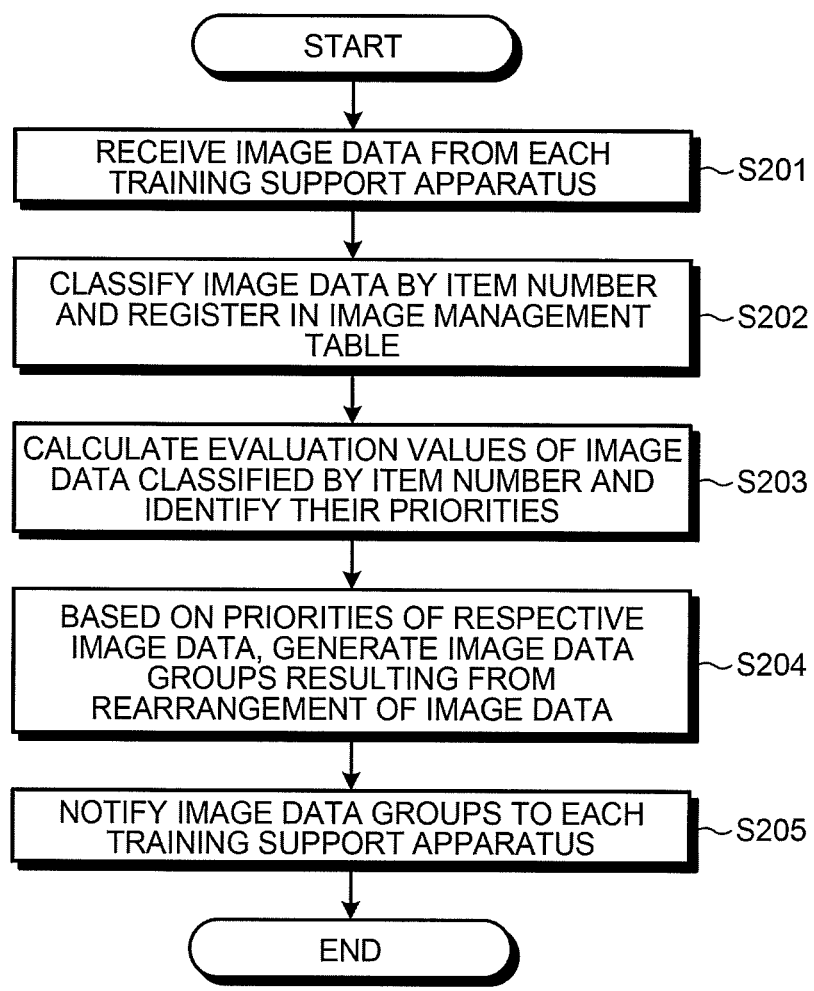
FIG. 29 is a flow chart illustrating a sequence of processing by the management apparatus according to the second embodiment.

Next, a sequence of processing by the management apparatus 300 according to the second embodiment will be described. FIG. 29 is a flow chart illustrating the sequence of the processing by the management apparatus according to the second embodiment. As illustrated in FIG. 29, the management apparatus 300 receives image data from each training support apparatus 200 (Step S201).

The management apparatus 300 classifies the image data for each item number and performs registration thereof in the image management table 341 (Step S202). The management apparatus 300 calculates evaluation values of image data classified by item number and identifies their priorities (Step S203).

The management apparatus 300 generates image data groups resulting from rearrangement of the image data, based on the priorities of the respective image data (Step S204). The management apparatus 300 notifies the image data groups to each training support apparatus 200 (Step S205).

Next, effects of the management apparatus 300 according to this second embodiment will be described. The management apparatus rearranges, according to the priorities, the plurality of image data, which are obtained from each training support apparatus 200 and are related to the item numbers of the check items indicating whether or not the criteria predetermined with respect to the farm produce are satisfied, and performs the notification to each training support apparatus. As a result, by the management apparatus 300, a plurality of trainers are able to share image data captured when a good case example and the like are found during inspection of whether or not criteria of check items are satisfied at various places in a farm, and are able to make use of the image data to their training, and thus a trainer is able to efficiently conduct training on how relevant locations should be improved in order to satisfy the criteria.

Further, the management apparatus 300 according to this second embodiment receives the evaluations of the image data related to the check items from each training support apparatus 200 and based on the evaluations, generates the image data groups. As a result, an image data group is able to be generated, with a priority of image data thereof highly useful in conducting training having been set high, for example. The training support apparatus 200 that has obtained this image data group will preferentially display the image data evaluated high for each item number and thus efficient training is able to be conducted.

Further, the management apparatus 300 according to this second embodiment determines the priorities of the image data based on the trainers who have captured the image data to generate the image data group. As a result, an image data group is able to be generated, with a priority of image data thereof captured by an experienced trainer having been set high, for example. The training support apparatus 200 that has obtained this image data group will preferentially display the image data captured by the experience trainer for each item number and thus efficient training is able to be conducted.

Of the processing described in the embodiments, all or a part of the processing described as being performed automatically may be performed manually, or all or a part of the processing described as being performed manually may be performed automatically by a known method. In addition, the sequences of the processing, the control sequences, the specific names, and the information including the various data and parameters described above and illustrated in the drawings may be arbitrarily modified unless otherwise specified.

Further, all or any part of each processing function performed in each processing unit, device, or apparatus may be realized by a CPU and a program analyzed and executed by the CPU, or realized as hardware by wired logic.

In the second embodiment, a case where the management apparatus 300 identifies the priorities of the image data corresponding to the item numbers of the JGAP criteria and generates the image data groups resulting from the rearrangement of the image data has been described, but limitation is not made thereto. For example, the management apparatus 300 may identify priorities of image data and generate image data groups resulting from rearrangement of the image data, similarly for image data associated with check items related to foods. Further, pairs of image data and comments corresponding to the image data may be rearranged to generate image data groups.

According to an embodiment of the present invention, an effect that a trainer is able to efficiently conduct training on how relevant locations should be improved in order to satisfy criteria is achieved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A management apparatus, comprising:
   a memory; and
   a processor coupled to the memory, wherein the processor executes a process comprising:
   receiving a plurality of check items that are subjected to inspection of whether or not the plurality of check items satisfy predetermined criteria, the plurality of check items being arranged in a predetermined order; and first image data related to the check items from a terminal apparatus, the terminal apparatus being used by a first trainer when the first trainer conducts training, the first image data being captured when the first trainer conducts training;
   rearranging, for each related check item, the first image data and second image data which is related to the check items, the second image data having been captured when a second trainer conducted training before, from a terminal apparatus,
   generating, for each related check item, an image data group of the first image data and the second image data having been rearranged; and
   notifying the image data groups generated for the respective check items to the of terminal apparatus which is used by the first trainer who is conducting training to make the terminal apparatus display the image data groups in association with each related check item.

2. The management apparatus according to claim 1, wherein the receiving receives evaluations of the first image data and the second image data related to the check item, and the generating generates, based on the evaluations, the image data group.

3. The management apparatus according to claim 1, wherein the receiving further receives information associating identification information of the first trainer of the terminal apparatus and the second trainer of the terminal apparatus with the first image data and the second image data and the generating generates, based on the identification information corresponding to the first image data and the second image data, the image data group.

4. A management method that is executed by a computer and that executes:

receiving a plurality of check items that are subjected to inspection of whether or not the plurality of check items satisfy predetermined criteria, the plurality of check items being arranged in a predetermined order; and first image data related to the check items from a terminal apparatus, the terminal apparatus being used by a first trainer when the first trainer conducts training, the first image data being captured when the first trainer conducts training;

rearranging, for each related check item, the first image data and second image data which is related to the check items, the second image data having been captured when a second trainer conducted training before, from a terminal apparatus;

generating, for each related check item, an image data group of the first image data and the second image data having been rearranged; and notifying the image data groups generated for the respective check items to the of terminal apparatus which is used by the first trainer who is conducting training to make the terminal apparatus display the image data groups in association with each related check item.

* * * * *